(12) United States Patent
Hung et al.

(10) Patent No.: US 11,447,418 B2
(45) Date of Patent: Sep. 20, 2022

(54) MASTIC ASPHALT COMPOSITION FOR PRODUCTION OF SURFACINGS

(71) Applicant: TOTAL MARKETING SERVICES, Puteaux (FR)

(72) Inventors: Yvong Hung, Lyons (FR); Régis Vincent, Grigny (FR)

(73) Assignee: TOTAL MARKETING SERVICES, Puteaux (FR)

( * ) Notice: Subject to any disclaimer, the term of this patent is extended or adjusted under 35 U.S.C. 154(b) by 715 days.

(21) Appl. No.: 16/473,136

(22) PCT Filed: Dec. 20, 2017

(86) PCT No.: PCT/FR2017/053720
§ 371 (c)(1),
(2) Date: Jun. 24, 2019

(87) PCT Pub. No.: WO2018/115730
PCT Pub. Date: Jun. 28, 2018

(65) Prior Publication Data
US 2019/0359526 A1 Nov. 28, 2019

(30) Foreign Application Priority Data
Dec. 22, 2016 (FR) .................................... 1663115

(51) Int. Cl.
| | |
|---|---|
| *C04B 26/26* | (2006.01) |
| *C04B 14/06* | (2006.01) |
| *C04B 24/04* | (2006.01) |
| *C04B 24/12* | (2006.01) |
| *E01C 7/22* | (2006.01) |
| *E01C 19/46* | (2006.01) |
| *C04B 111/00* | (2006.01) |

(52) U.S. Cl.
CPC .............. *C04B 26/26* (2013.01); *C04B 14/06* (2013.01); *C04B 24/04* (2013.01); *C04B 24/124* (2013.01); *E01C 7/22* (2013.01); *E01C 19/46* (2013.01); *C04B 2111/0075* (2013.01)

(58) Field of Classification Search
CPC ....... C04B 14/06; C04B 24/04; C04B 24/124; C04B 26/26; C04B 2111/0075; C08K 5/092; C08K 5/20; C08K 5/25; C08L 95/00; C08L 2555/22; C09D 195/00
See application file for complete search history.

(56) References Cited

U.S. PATENT DOCUMENTS

| | | |
|---|---|---|
| 3,026,568 A | 3/1962 | Moar |
| 4,279,579 A | 7/1981 | Froeschke |
| 4,305,812 A | 12/1981 | Shih et al. |
| 4,455,216 A | 6/1984 | Angevine et al. |
| 2003/0149138 A1 | 8/2003 | Lemoine et al. |
| 2004/0069685 A1 | 4/2004 | Inomata et al. |
| 2006/0230981 A1 | 10/2006 | Dean |
| 2011/0257318 A1 | 10/2011 | Neuville et al. |
| 2011/0290695 A1 | 12/2011 | Thomas |
| 2012/0123028 A1 | 5/2012 | Dreesen et al. |
| 2013/0298800 A1 | 11/2013 | Lapalu et al. |
| 2016/0304793 A1 | 10/2016 | Merdrignac et al. |
| 2017/0174962 A1 | 6/2017 | Mouazen et al. |
| 2017/0218177 A1 | 8/2017 | Vincent et al. |
| 2017/0226320 A1 | 8/2017 | Mariotti et al. |

FOREIGN PATENT DOCUMENTS

| | | |
|---|---|---|
| CN | 101585118 A | 11/2009 |
| EP | 1 473 327 A1 | 11/2004 |
| EP | 1 783 174 A1 | 5/2007 |
| FR | 2 721 936 A1 | 1/1996 |
| WO | 2004/020532 A1 | 3/2004 |
| WO | 2007/058994 A2 | 5/2007 |
| WO | 2007/128636 A2 | 11/2007 |
| WO | 2008/022836 A1 | 2/2008 |
| WO | 2008/043635 A1 | 4/2008 |
| WO | 2008/137394 A1 | 11/2008 |
| WO | 2008/141930 A1 | 11/2008 |
| WO | 2008/141932 A1 | 11/2008 |
| WO | 2009/015969 A1 | 2/2009 |
| WO | 2009/071467 A1 | 6/2009 |
| WO | 2009/133306 A2 | 11/2009 |
| WO | 2009/150519 A2 | 12/2009 |
| WO | 2009/153324 A1 | 12/2009 |
| WO | 2010/028261 A2 | 3/2010 |
| WO | 2011/000133 A1 | 1/2011 |
| WO | 2012/168380 A1 | 12/2012 |

OTHER PUBLICATIONS

Lee et al.; "Separation of solvent and deasphalted oil for solvent deasphalting process;" Fuel Processing Technology; 2014; pp. 204-210; vol. 119.
Brunauer et al.; "Adsorption of Gases in IMultimolecular Layers;" J. Am Chemical Society; 1938; pp. 309-319; vol. 60.
Mar. 1, 2018 Written Opinion issued in International Patent Application No. PCT/2017/053720.
Mar. 1, 2018 Search Report issued in International Patent Application No. PCT/FR2017/053720.

*Primary Examiner* — Anthony J Green
(74) *Attorney, Agent, or Firm* — Oliff PLC

(57) ABSTRACT

A composition including at least: a binder base chosen from: a bitumen base, a pitch base, a clear binder, or a mixture of one or more of these binder bases, an acid compound of general formula (I): R—(COOH)$_z$ (I). an amide compound of general formula (II): R'—(NH)$_n$CONH—(X)$_m$—(NHCO)$_p$(NH)$_n$—R" (II) the compounds (I) and (II) being present in a weight ratio ranging from 10:1 to 1:16, for preparing a mastic asphalt composition. Mastic asphalt compositions and surfacings are thus obtained.

20 Claims, 2 Drawing Sheets

MASTIC ASPHALT COMPOSITION FOR PRODUCTION OF SURFACINGS

The present invention relates to the use of a binder composition, which is solid at ambient temperature, in particular at high ambient temperature, for the preparation of mastic asphalt. It relates to the mastic asphalt compositions prepared from this binder composition and having improved properties. It relates to a process for manufacturing mastic asphalt.

STATE OF THE PRIOR ART

A mastic asphalt is conventionally a dense material comprising a binder, generally of bituminous type, and mineral fillers consisting of fines, of sand and of stone chippings. The mineral filler composition of the mastic asphalt is usually chosen so as to minimize voids. In particular, mastic asphalts differ from the other bituminous mixes by virtue of their very high content of bituminous binder and of fines or fillers, that is to say of mineral fillers having a diameter of less than or equal to 0.063 mm.

Mastic asphalt is generally manufactured by mixing the various mineral fillers into the binder brought to the liquid state by raising the temperature, and by continuous mixing of the mixture in order to obtain a substantially homogeneous composition. The mixture is then hot-poured and solidifies upon cooling. The mastic asphalt surfacing thus obtained can be used as it is and without additional compacting.

Mastic asphalts are normally used in the construction of roads, in particular the surfacing of carriageways, of ground surfaces of car parks; of pedestrian walkways, such as sidewalks or terraces; of urban developments, such as skateboard runs; in the production of ground surfaces of sports equipment or of industrial sites; in the waterproofing of buildings or of civil engineering works; for special technical applications such as mastics for rockfill, coldroom floors, interior or exterior anti-acid asphalts.

The binder may be a bituminous binder, a clear binder, or a pitch-based binder, depending on the intended final application. The bituminous binder is generally in the form of a black material that is highly viscous, or even solid, at ambient temperature and which fluidifies on heating. The clear binder is in the form of a clear material which may be colored, for example by the addition of pigment, and which fluidifies on heating.

The mechanical properties of the mastic asphalt surfacing depend on the percentages and the nature of the various components: mineral fillers and binder. The three fundamental properties of mastic asphalt that it is desired to control are: the ability to be hot-poured, the waterproof nature and the wear resistance, in particular the resistance to indentation. Additionally, the slippery nature of the surfacing, a property that it is desired to avoid, sometimes also has to be evaluated.

Mastic asphalts are mainly produced by mixing a hydrocarbon-based binder, such as in particular a bituminous composition, or a clear binder or a pitch-based binder, and mineral solid fillers. The prior art asphalts are generally poured at high temperature, i.e. at a temperature of between 200° C. and 270° C. approximately, more often between 210° C. and 250° C. The use of such temperatures for the preparation of mastic asphalts is not without drawbacks, in particular considerable release of fumes, linked to the decomposition of the binder, and a high energy cost for bringing all of the components to the desired temperature.

Several prior documents describe attempts to formulate a mastic asphalt that can be prepared at lower temperatures, for instance EP 2 276 811. This document describes a mastic asphalt prepared from a bituminous base and additives for regulating physicochemical properties, comprising a wax of animal origin and one or more ethylenediamine amides. Document FR 2 721 936 teaches adding a hydrocarbon wax to the binder, in a proportion that can reach 15% by weight of the binder, with the aim of lowering the temperature at which the asphalts are used. FR 2 855 523 proposes adding, in addition to a hydrocarbon wax, a second additive, consisting of a fatty acid ester wax having a melting point of less than 85° C.

The vast majority of the bitumen used for the manufacture of mastic asphalt is generally in the form of a black material that is highly viscous, or even solid, at ambient temperature, and which fluidifies on heating.

In general, the various types of binders, bituminous binders, clear binders, or pitch-based binders, are stored and transported hot, in bulk, in tanker trucks or by boats at high temperatures of the order of 120° C. to 160° C. However, the storage and transportation of these binders under hot conditions has some disadvantages. Firstly, the transportation of these binders under hot conditions in the liquid form is considered to be dangerous and it is highly restricted from a regulatory viewpoint. This mode of transportation does not present any particular difficulties when the transportation equipment and infrastructures are in good condition. When such is not the case, it may become problematic: if the tanker truck is not sufficiently thermally insulated, the viscosity of the binder may increase during an excessively long journey. The delivery distances of the binder are therefore limited. Secondly, maintaining the binder at high temperatures in tanks or in tanker trucks consumes energy. In addition, keeping the binder at high temperatures for a lengthy period can affect the properties of the binder and thus change the final performance qualities of the bituminous mix, in particular of the mastic asphalt.

To overcome the problems of transportation and storage of binders under hot conditions, packaging for transporting and storing binders, at ambient temperature has been developed. This mode of transportation of binders in packaging at ambient temperature represents only a minimal fraction of the amounts transported worldwide, but it corresponds to very real needs for geographic regions which are difficult and expensive to access by conventional transportation means.

By way of example of packaging which makes possible the transportation under cold conditions currently used, mention may be made of the packaging of binders at ambient temperature in metal drums. This means is increasingly questionable from an environmental perspective since the binder stored in the drums must be reheated before it is used as road binder. However, this operation is difficult to perform for this type of packaging, and the drums constitute waste after use. Furthermore, the storage of the binder at ambient temperature in drums leads to losses because the binders are very viscous and part of the product remains on the walls of the drum during the transfer into the tanks of the bituminous mix production units. With regard to the handling and the transportation of bituminous products or of clear binders in these drums, they can prove to be difficult and dangerous if specialized equipment for handling the drums is not available to the haulage contractors or at the site where the bitumen or the clear binder is used.

Other examples of packaging at ambient temperature that may be mentioned include bitumens in the form of pellets transported and/or stored in bags, which are often used in places where the ambient temperature is high. These pellets have the advantage of being easy to handle. U.S. Pat. No. 3,026,568 describes bitumen pellets covered with a dusty material, such as limestone powder. Nevertheless, this type of bitumen as pellets does not prevent the bitumen from creeping, in particular at high ambient temperature.

Patent application WO 2009/153324 describes bitumen pellets coated with a polymeric anticaking compound, in particular polyethylene. The disadvantage of this coating is that it modifies the properties of the bitumen during its road application.

The application WO 2016/016318 describes bitumen pellets comprising a chemical additive which can be a mono- or polyacid, a hydrazide or a diamide. These bitumen pellets allow the transportation and/or storage and/or handling of the bitumen at ambient temperature without the bitumen undergoing creep, and also the reduction in their adhesion and agglomeration together.

Document WO2015/158889 describes the use, as a bonding binder, of a bituminous composition comprising at least one acid additive of formula (I), $R^1$—$(COOH)_z$, wherein $R^1$ is a linear or branched, saturated or unsaturated, hydrocarbon-based chain comprising from 4 to 68 carbon atoms, and z is an integer varying from 1 to 4. Such a composition is stored in the form of bitumen blocks.

Document WO2008/107551 describes a bituminous composition comprising a major portion of at least one bitumen and a minor portion of at least one organogelator chemical additive which may be a polyacid, a hydrazide, or a diamide. Such a composition has thermoreversible viscosity and hardness properties.

FR 3 024 454 discloses a process for transporting and/or storing road bitumen under cold conditions in the form of blocks. The bitumen block comprises at least one chemical additive chosen from: a compound of acid, in particular diacid, type and a compound of diamide type.

CN 101 585 118 describes an environmentally friendly brazing flux for preparing a low-temperature, lead-free solder paste. The brazing flux comprises in particular resin, an activating agent and a rheological agent.

There remains, however, the need for binder compositions such as bitumens, clear binders or pitch-based binders, having improved mechanical strength properties, especially improved hardness properties, without the viscosity under hot conditions of these compositions becoming too high, which makes it possible to lower the coating and application temperature of the mastic asphalts. Furthermore, it has been sought to develop binder compositions which can be formulated in the form of a block or pellet with a reduced creep compared with the compositions of the prior art, so that a coating with a polymer-based or gel-based shell is not necessary.

The applicant has discovered, surprisingly, a new binder composition which makes it possible to prepare mastic asphalts, the mechanical properties of which are improved and the application temperature range of which is lowered, i.e. between 160 and 200° C., that is to say significantly lower than the conventional temperature range for applying mastic asphalts, of between 200 and 230° C.

This new binder composition makes it possible to formulate mastic asphalts which have improved mechanical resistance properties, in particular improved indentation-resistance properties, and also a reduced coating and application temperature.

The applicant has thus discovered a new binder composition which allows use for the manufacture of mastic asphalts, which allows a greater handleability of mastic asphalts when they are applied as carriageway surfacings.

In addition, the binder composition developed by the applicant can be in divided form, especially in the form of binder pellets or binder blocks, while at the same time avoiding and reducing the adhesion and agglomeration of pellets or blocks during transportation and/or storage and/or handling of the binder, at high ambient temperature, over long periods. Moreover, the properties of the binder are preserved over time.

More precisely, the applicant demonstrated that this novel binder composition makes it possible to withstand creep under extreme transportation and/or storage and/or handling conditions, under compression conditions, in particular due to storage, over very long periods.

This new composition makes it possible to form binder pellets and binder blocks which do not require coating with a gel or a shell or an anticaking agent so that they do not adhere or creep. However, these coating possibilities are not excluded from the scope of the invention.

Moreover, during the manufacture of bituminous mixes, since the aggregates are heated and mixed with the solid binder composition, they cause the latter to melt and steps of heating the binder to a high temperature and maintaining it at a high temperature are avoided, said steps being both expensive and polluting.

SUMMARY OF THE INVENTION

The invention relates to the use of a composition comprising at least:
A binder base chosen from:
  a bitumen base,
  a pitch base,
  a clear binder, or
  a mixture of one or more of these binder bases,
An acid compound of general formula (I):

$$R-(COOH)_z \quad\quad (I)$$

wherein R represents a linear or branched, saturated or unsaturated chain comprising from 4 to 68 carbon atoms and z is an integer ranging from 2 to 4,
An amide compound of general formula (II):

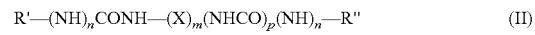

$$R'-(NH)_n CONH-(X)_m (NHCO)_p (NH)_n-R'' \quad\quad (II)$$

wherein:
the R' and R'' groups, which may be identical or different, represent a saturated or unsaturated and linear, branched or cyclic hydrocarbon-based chain comprising from 1 to 22 carbon atoms which optionally comprises heteroatoms, such as N, O or S, $C_5$-$C_{24}$ hydrocarbon-based rings and/or $C_4$-$C_{24}$ hydrocarbon-based heterocycles comprising one or more heteroatoms, such as N, O or S, and R'' may be H;
the X group represents a saturated or unsaturated and linear, cyclic or branched hydrocarbon-based chain comprising from 1 to 22 carbon atoms which is optionally substituted and which optionally comprises heteroatoms, such as N, O or S, $C_5$-$C_{24}$ hydrocarbon-based rings and/or $C_4$-$C_{24}$ hydrocarbon-based heterocycles comprising one or more heteroatoms, such as N, O or S;
n and m and p are integers having a value of 0 or 1, independently of one another, and
the compounds (I) and (II) are present in a weight ratio ranging from 10:1 to 1:16,
in order to prepare a mastic asphalt composition.

Another subject of the invention is a mastic asphalt composition comprising:
(i) 5% to 20% of a composition comprising at least:
A binder base chosen from:
a bitumen base,
a pitch base,
a clear binder, or
a mixture of one or more of these binder bases,
An acid compound of general formula (I):

$$R\text{—}(COOH)_z \qquad (I)$$

wherein R represents a linear or branched, saturated or unsaturated chain comprising from 4 to 68 carbon atoms and z is an integer ranging from 2 to 4,
An amide compound of general formula (II):

$$R'\text{—}(NH)_n CONH\text{—}(X)_m\text{—}(NHCO)_p(NH)_n\text{—}R'' \qquad (II)$$

wherein:
the R' and R" groups, which may be identical or different, represent a saturated or unsaturated and linear, branched or cyclic hydrocarbon-based chain comprising from 1 to 22 carbon atoms which optionally comprises heteroatoms, such as N, O or S, $C_5$-$C_{24}$ hydrocarbon-based rings and/or $C_4$-$C_{24}$ hydrocarbon-based heterocycles comprising one or more heteroatoms, such as N, O or S, and R" may be H;
the X group represents a saturated or unsaturated and linear, cyclic or branched hydrocarbon-based chain comprising from 1 to 22 carbon atoms which is optionally substituted and which optionally comprises heteroatoms, such as N, O or S, $C_5$-$C_{24}$ hydrocarbon-based rings and/or $C_4$-$C_{24}$ hydrocarbon-based heterocycles comprising one or more heteroatoms, such as N, O or S;
n and m and p are integers having a value of 0 or 1, independently of one another, and
the compounds (I) and (II) are present in a weight ratio ranging from 10:1 to 1:16, and
(ii) 15% to 40% of fines,
(iii) from 15% to 45% of sand,
(iv) from 10% to 45% of stone chippings,
the percentages being expressed by weight relative to the total weight of the composition.

According to one preferred embodiment, the compounds (I) and (II) are present in a weight ratio ranging from 5:1 to 1:9.

According to one preferred embodiment, the additive (I) is a diacid of general formula $HOOC\text{—}C_wH_{2w}\text{—}COOH$, wherein w is an integer varying from 4 to 22.

According to one preferred embodiment, the mastic asphalt composition comprises from 0.1% to 5% by weight of the additive (I) relative to the total weight of the binder composition.

According to a first preferred variant, the additive (II) is chosen from those of formula (IIA):

$$R'\text{—}CONH\text{—}(X)_m\text{—}NHCO\text{—}R'' \qquad (IIA)$$

wherein:
the R' and R" groups, which may be identical or different, represent a saturated or unsaturated and linear, branched or cyclic hydrocarbon-based chain comprising from 1 to 22 carbon atoms which optionally comprises heteroatoms, such as N, O or S, $C_5$-$C_{24}$ hydrocarbon-based rings and/or $C_4$-$C_{24}$ hydrocarbon-based heterocycles comprising one or more heteroatoms, such as N, O or S;
the X group represents a saturated or unsaturated and linear, cyclic or branched hydrocarbon-based chain comprising from 1 to 22 carbon atoms which is optionally substituted and which optionally comprises heteroatoms, such as N, O or S, $C_5$-$C_{24}$ hydrocarbon-based rings and/or $C_4$-$C_{24}$ hydrocarbon-based heterocycles comprising one or more heteroatoms, such as N, O or S;
m is an integer having a value of 0 or 1.

According to another preferred variant, the additive (II) is chosen from those of formula (IIB):

$$R'\text{—}CONH\text{—}R'' \qquad (IIB)$$

wherein:
the R' and R" groups, which may be identical or different, represent a saturated or unsaturated and linear, branched or cyclic hydrocarbon-based chain comprising from 1 to 22 carbon atoms which optionally comprises heteroatoms, such as N, O or S, $C_5$-$C_{24}$ hydrocarbon-based rings and/or $C_4$-$C_{24}$ hydrocarbon-based heterocycles comprising one or more heteroatoms, such as N, O or S.

According to one preferred embodiment, the compound of general formula (II) is chosen from:
hydrazide derivatives such as: $C_5H_{11}\text{—}CONH\text{—}NHCO\text{—}C_5H_{11}$, $C_9H_{19}\text{—}CONH\text{—}NHCO\text{—}C_9H_{19}$, $C_{11}H_{23}\text{—}CONH\text{—}NHCO\text{—}C_{11}H_{23}$, $C_{17}H_{35}\text{—}CONH\text{—}NHCO\text{—}C_{17}H_{35}$, or $C_{21}H_{43}\text{—}CONH\text{—}NHCO\text{—}C_{21}H_{43}$;
diamides such as N,N'-ethylenedi(laurylamide) of formula $C_{11}H_{23}\text{—}CONH\text{—}CH_2\text{—}CH_2\text{—}NHCO\text{—}C_{11}H_{31}$, N,N'-ethylenedi(myristylamide) of formula $C_{13}H_{27}\text{—}CONH\text{—}CH_2\text{—}CH_2\text{—}NHCO\text{—}C_{13}H_{27}$, N,N'-ethylenedi(palmitamide) of formula $C_{15}H_{31}\text{—}CONH\text{—}CH_2\text{—}CH_2\text{—}NHCO\text{—}C_{15}H_{31}$, N,N'-ethylenedi(stearamide) of formula $C_{17}H_{35}\text{—}CONH\text{—}CH_2\text{—}CH_2\text{—}NHCO\text{—}C_{17}H_{35}$;
monoamides such as laurylamide of formula $C_{11}H_{23}\text{—}CONH_2$, myristylamide of formula $C_{13}H_{27}\text{—}CONH_2$, palmitamide of formula $C_{15}H_{31}\text{—}CONH_2$, stearamide of formula $C_{17}H_{35}\text{—}CONH_2$.

The invention relates to a process for manufacturing mastic asphalts as described above and in detail below, which comprises at least the steps of:
heating the aggregates to a temperature ranging from 100° C. to 180° C., preferably from 120° C. to 160° C.,
mixing the aggregates with the binder composition,
kneading the mixture,
obtaining a mastic asphalt composition.

According to one preferred embodiment of the process, the binder composition is used in a form that is solid under cold conditions and divided.

According to one preferred embodiment, the process does not comprise a step of heating the binder composition before it is mixed with the aggregates.

The invention also relates to a surfacing of a surface, this surfacing being obtained by means of a process comprising the preparation of a mastic asphalt composition as described above and in detail below, and the application thereof and spreading thereof on said surface.

DETAILED DESCRIPTION

Figure 1:
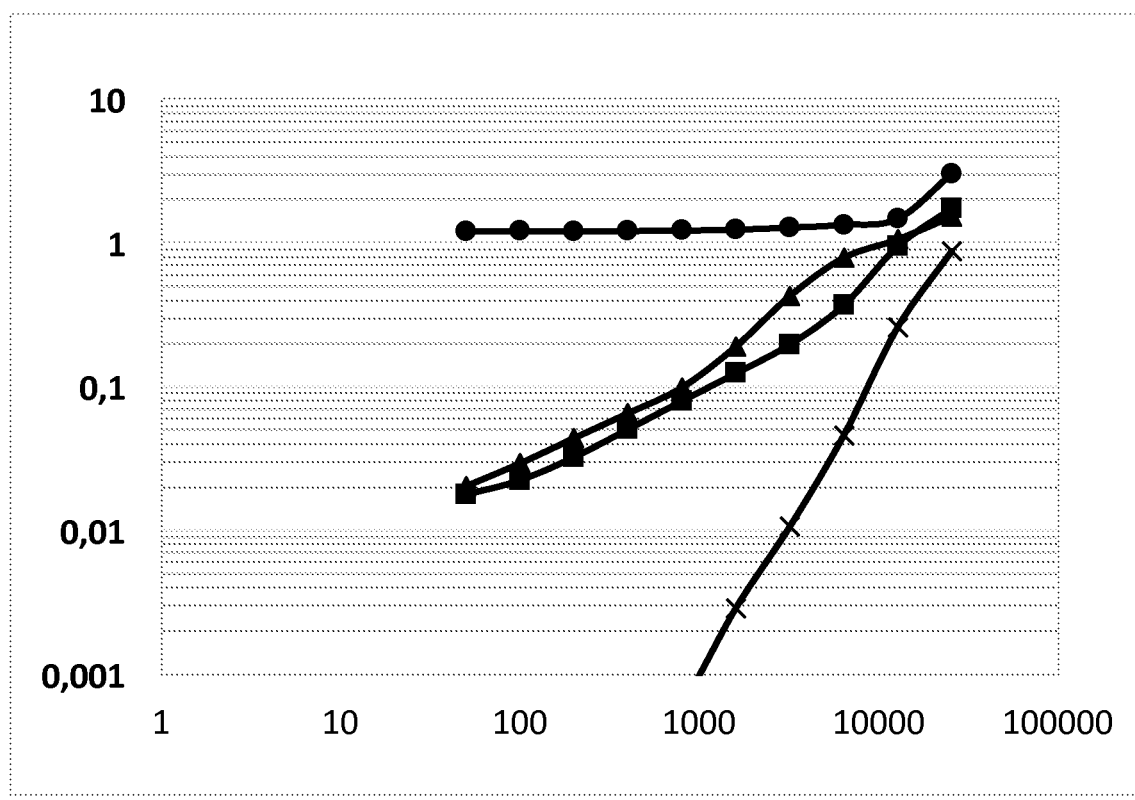
FIG. 1 is a graphic representation of irreversible creep compliance divided by the stress of bituminous binder compositions C9, C10, C11 and C12.

The invention is based on the synergistic combination of two additives, an acid compound and an amide-type compound. Such compounds were known from the prior art for the formulation of bitumen compositions that are solid under cold conditions and in divided form. However, the selection of two of these additives in particular proportions makes it possible to observe a synergy of action between these additives regarding the mechanical strength properties of these binder compositions, in particular regarding their indentation resistance, without the viscosity under hot conditions being degraded compared with the compositions of the prior art.

The term "high ambient temperature" is intended to mean the temperature resulting from the climatic conditions under which the binder composition is transported and/or stored and/or handled. More precisely, the high ambient temperature is equivalent to the temperature reached during the transportation and/or storage of the binder composition, this temperature being less than 100° C. Advantageously, the high ambient temperature is from 20° C. to 90° C., preferably from 20° C. to 80° C., more preferentially from 40° C. to 80° C. and even more preferentially from 40° C. to 60° C., it being understood that high ambient temperature implies that no heat is supplied other than that resulting from the climatic conditions.

The term "extreme conditions" refers to the conditions for transporting and/or storing and/or handling the binder composition with a transportation and/or storage and/or handling temperature of the binder composition ranging up to 100° C., advantageously from 20° C. to 90° C., preferably from 20° C. to 80° C., more preferentially from 40° C. to 80° C. and even more preferentially from 40° C. to 60° C.

The invention relates to binder compositions that may be solid when they are subjected to high ambient temperatures, in particular a temperature ranging up to 100° C., advantageously from 20° C. to 90° C., preferably from 20° C. to 80° C., more preferentially from 40° C. to 80° C. and even more preferentially from 40° C. to 60° C.

The invention relates to binder compositions that may be solid when they are subjected to high ambient temperatures, in particular a temperature ranging up to 100° C., advantageously from 20° C. to 90° C., preferably from 20° C. to 80° C., more preferentially from 40° C. to 80° C. and even more preferentially from 40° C. to 60° C.

The term "binder that is solid at high ambient temperature" is intended to mean a binder which has a solid appearance at high ambient temperature under transportation and/or storage and/or handling conditions. More precisely, the term "binder that is solid at high ambient temperature" is intended to mean a binder which retains its solid appearance throughout the transportation and/or storage and/or handling at high ambient temperature, i.e. a binder which does not creep at a temperature ranging up to 100° C., advantageously from 20° C. to 90° C., preferably from 20° C. to 80° C., more preferentially from 40° C. to 80° C. and even more preferentially from 40° C. to 60° C., under its own weight and, furthermore, which does not creep when it is subjected to a temperature ranging up to 100° C., advantageously from 20° C. to 90° C., preferably from 20° C. to 80° C., more preferentially from 40° C. to 80° C. and even more preferentially from 40° C. to 60° C., and to pressure forces derived from the transportation and/or storage and/or handling conditions.

A creep test for evaluating this property is set out in the experimental section.

For the purposes of the present invention, the term "binder" is intended to mean a composition comprising at least one binder base chosen from a bitumen base, a pitch base, a clear binder or mixtures thereof, said composition being usable in a mixture with aggregates, as a replacement for the binders conventionally used, for the preparation of mastic asphalts.

The term "penetrability" is intended here to mean the "needle penetrability" measurement, which is carried out by means of an NF EN 1426 standardized test at 25° C. (P25). This penetrability characteristic is expressed in tenths of a millimeter (dmm or 1/10 mm). The needle penetrability, measured at 25° C., according to the NF EN 1426 standardized test, represents the measurement of the penetration into a bitumen sample or into a sample of another type of binder, after a time of 5 seconds, of a needle, the weight of which with its support is 100 g. The standard NF EN 1426 replaces the endorsed standard NF T 66-004 of December 1986 with effect from Dec. 20, 1999 (decision of the Director General of AFNOR dated Nov. 20, 1999).

The term "softening point" is intended to mean the "softening point" measurement which is performed by means of an NF EN 1427 standardized test. The ring and ball softening point corresponds to the temperature at which a steel ball of standard diameter, after having passed through the test material (stuck in a ring), reaches the bottom of a standardized tank filled with a liquid which is gradually heated and into which the apparatus has been immersed.

The expression "is essentially composed of", followed by one or more characteristics, means that, besides the components or steps explicitly listed, components or steps which do not significantly modify the properties and characteristics of the invention can be included in the process or the material of the invention.

The expression "of between X and Y" includes the limits, unless explicitly mentioned otherwise. This expression thus means that the range targeted comprises the values X, Y and all the values ranging from X to Y.

The term "mastic asphalt composition" is intended to mean the mixture of the various components of a mastic asphalt before they are used by hot-pouring to form an asphalt surfacing on a support. The term "surfacing" is intended to mean the cooled material obtained after the processing (mixing and pouring) of the mastic asphalt composition.

For the purposes of the invention, the terms "binder" and "road binder" are used equivalently and independently of one another. The term "binder" or "road binder" is intended to mean any compositions consisting of one or more binder bases chosen from bitumen bases, pitch bases, clear binders or mixtures thereof and optionally comprising one or more chemical additives, said compositions being suitable for use in a road application, in particular for the production of mastic asphalts.

For the purposes of the invention, the terms "bitumen" and "bituminous binder" are used equivalently and independently of one another. The term "bitumen" or "bituminous binder" is intended to mean any bituminous compositions consisting of one or more bitumen bases and optionally comprising one or more chemical additives, said compositions being capable of being used in a road application, in particular as a mixture with aggregates.

The invention also relates to the use of a particular binder composition, comprising at least one binder base and at least two additives having a synergistic action on the mechanical and viscosity-reducing properties. This improvement in the mechanical properties consists in particular of an improvement in the indentation resistance, which is a property that is particularly desired for the formulation of mastic asphalts. This is in particular because mastic asphalts are used for surfacing ground surfaces subjected to repeated mechanical stresses caused by shoe heels. The term "viscosity reducing" is intended to mean a reduction of the mastic asphalt coating and application temperatures below 200° C.

The Binder Composition

According to the invention, the binder composition comprises at least one binder base chosen from bitumen bases, pitch bases, clear binders or mixtures thereof.

Advantageously, the binder base represents at least 50% by weight relative to the total weight of the binder composition, even more advantageously at least 75% by weight relative to the total weight of the binder composition.

Even more advantageously, the binder base represents at least 90% by weight relative to the total weight of the binder composition, and preferably at least 95% by weight relative to the total weight of the binder composition.

First Variant

According to a first variant, the binder base comprises at least one bitumen base. According to this variant, it may also comprise, in a nonlimiting manner, at least one pitch, at least one oil, at least one elastomer, and/or at least one olefinic polymer adjuvant.

According to one embodiment of this first variant, the binder base comprises at least one bitumen base and from 0.5% to 15% by weight, preferably from 1% to 15% by weight, more preferentially from 2% to 12% by weight of polymer, advantageously of elastomer, relative to the total weight of the binder base.

According to one embodiment of this first variant, the binder composition comprises from 0.05% to 15% by weight, preferably from 0.1% to 10% by weight, more preferentially from 0.5% to 6% by weight of at least one olefinic polymer adjuvant relative to the total weight of the binder base.

According to one embodiment, the bitumen base is used as a mixture with at least one pitch.

Advantageously, according to this embodiment, the binder base comprises:
a) at least one pitch with a penetrability at 25° C. ranging from 0 to 20 1/10 mm and a ring and ball softening point (RBSP) ranging from 115° C. to 175° C., it being understood that the penetrability is measured according to the standard EN 1426 and that the RBSP is measured according to the standard EN 1427, and
b) at least one bitumen base.

Advantageously, according to this embodiment, the binder base comprises from 2% to 30% by weight of pitch relative to the total weight of the binder base, preferably from 3% to 20% by weight of pitch relative to the total weight of the binder base.

Second Variant

According to a second variant, the binder base comprises at least one pitch. According to this variant, it may also comprise, in a nonlimiting manner, at least one bitumen base, at least one oil, at least one elastomer and/or at least one olefinic polymer adjuvant.

According to one embodiment, the pitch is used as a mixture with at least one oil in the binder base.

Advantageously, according to this embodiment, the binder base comprises:
90% to 10% by weight of at least one oil chosen from: hydrocarbon-based oils of petroleum or synthetic origin,
10% to 90% by weight of at least one pitch,
relative to the total weight of the binder base.

Preferably, according to this embodiment, the binder base comprises:
10% to 70% by weight of at least one oil chosen from: hydrocarbon-based oils of petroleum or synthetic origin,
90% to 30% by weight of at least one pitch,
relative to the total weight of the binder base.

More preferentially, according to this embodiment, the binder base comprises:
15% to 50% by weight of at least one oil chosen from: hydrocarbon-based oils of petroleum or synthetic origin,
50% to 85% by weight of at least one pitch,
relative to the total weight of the binder base.

Third Variant

According to a third variant, the binder base is a clear binder base.

Usually, the clear binder base comprises:
i) a plasticizer,
ii) a structuring agent, for example a hydrocarbon-based or plant resin,
iii) a polymer,
iv) where appropriate, doping agents, or dopants, or adhesion dopants.

In one embodiment, the amount of plasticizer used in the clear binder base is from 40% to 80%, preferably from 45% to 70% by weight, relative to the total weight of the clear binder base.

In one embodiment, the weight ratio between the structuring agent and the plasticizer used for the preparation of the clear binder base is from 0.3 to 1.5, for example from 0.5 to 1.

In one specific embodiment, the amount of structuring agent used in the process for preparing the clear binder base is from 25% to 50% by weight relative to the total weight of clear binder base.

In one specific embodiment, the total amount of polymer in the clear binder base is from 0.5% to 20% by weight, preferably from 1% to 10%, preferably from 1% to 7%, for example from 2% to 5%, relative to the total weight of clear binder base.

When they are added to the clear binder base, the adhesion dopants represent in general between 0.05% and 0.5% by weight relative to the weight of the clear binder base. For example, in one specific embodiment, 0.05% to 0.5% of amine, preferably 0.1% to 0.3% of amine, relative to the total weight of clear binder base, will be added.

The Bitumen Base

The bitumen base may be used alone as a binder base or as a mixture with other components, such as an oil, a pitch, a polymer, and/or an olefinic polymer adjuvant, to form a more complex binder base.

Mention may first of all be made, among the bitumen bases which can be used according to the invention, of bitumens of natural origin, those present in natural bitumen or natural asphalt deposits or bituminous sands and bitumens originating from the refining of crude oil. The bitumen bases according to the invention are advantageously chosen from bitumen bases originating from the refining of crude oil. The bitumen bases may be chosen from bitumen bases or mixtures of bitumen bases originating from the refining of crude oil, in particular bitumen bases containing asphaltenes or pitches. The bitumen bases may be obtained via conventional processes for manufacturing bitumen bases at a refinery, in particular by direct distillation and/or vacuum distillation of oil. These bitumen bases can optionally be visbroken and/or deasphalted and/or air-rectified. It is common practice to perform vacuum distillation on the atmospheric residues originating from the atmospheric distillation of crude oil. This manufacturing process consequently corresponds to the sequence of an atmospheric distillation and of a vacuum distillation, the feedstock supplying the vacuum distillation corresponding to the atmospheric residues. These vacuum residues derived from the vacuum distillation tower may also be used as bitumens. It is also standard to inject air into a feedstock generally composed of distillates and of heavy products originating from the vacuum distillation of atmospheric residues originating from the distillation of oil. This process makes it possible to obtain a blown or semi-blown or oxidized or air-rectified or partially air-rectified base.

The various bitumen bases obtained via the refining processes may be combined together to obtain the best technical compromise. The bitumen base may also be a recycled bitumen base. The bitumen bases may be bitumen bases of hard grade or of soft grade.

According to the invention, for conventional processes for the manufacture of bitumen bases, the operation is carried out at manufacturing temperatures of between 100° C. and 200° C., preferably between 140° C. and 200° C., more preferably between 140° C. and 170° C., and with stirring for a period of time of at least 10 minutes, preferably of between 30 minutes and 10 hours, more preferably between 1 hour and 6 hours. The term "manufacturing temperature" means the temperature of heating of the bitumen base(s) before mixing and also the mixing temperature. The heating time and temperature vary according to the amount of bitumen used and are defined by the standard NF EN 12594.

According to the invention, blown bitumens can be manufactured in a blowing unit by passing a stream of air and/or oxygen through a starting bituminous base. This operation may be performed in the presence of an oxidation catalyst, for example phosphoric acid. The blowing is generally performed at high temperatures, of the order of 200 to 300° C., for relatively long times typically between 30 minutes and 2 hours, continuously or in batches. The blowing time and temperature are adjusted as a function of the properties targeted for the blown bitumen and as a function of the quality of the starting bitumen.

Preferentially, the bitumen base used to manufacture the compositions of the invention has a needle penetration measured at 25° C. according to the standard EN 1426 of 5 to 330 1/10 mm, preferably 20 to 220 1/10 mm. In a well-known manner, the "needle penetration" measurement is carried out by means of an NF EN 1426 standardized test at 25° C. ($P_{25}$). This penetration characteristic is expressed in tenths of a millimeter (dmm or 1/10 mm). The needle penetration, measured at 25° C., according to the NF EN 1426 standardized test, represents the measurement of the penetration of a needle, the weight of which with its support is 100 g, into a bitumen sample, after a time of 5 seconds. The standard NF EN 1426 replaces the equivalent standard NF T 66-004 of December 1986 with effect on Dec. 20, 1999 (decision of the Director General of AFNOR dated Nov. 20, 1999).

The Pitch

The pitch may be used alone as a binder base or as a mixture with other components such as an oil or a bitumen base to form a more complex binder base.

According to one embodiment of the invention, the pitch is a blown pitch, also called an oxidized pitch. According to the invention, use will be made, independently of one another, of the terms "blown pitch" and "oxidized pitch".

According to the dictionary, the term "pitch" is understood to mean a residue from the distillation of tars from oil, from coal, from wood or from other organic molecules.

The pitch used in the invention is chosen from petroleum distillation residues, also known as "petroleum pitch".

In the description, the terms "pitch", "petroleum pitch" and "deasphalting pitch" will be used independently of one another.

The pitches may be obtained via conventional manufacturing processes in a refinery. The manufacturing process corresponds to the sequence of an atmospheric distillation and of a vacuum distillation. In a first step, the crude oil is subjected to a distillation at atmospheric pressure, which results in a gas phase, different distillates and an atmospheric distillation residue being obtained. The residue from the atmospheric distillation is then itself subjected to a distillation under reduced pressure, known as vacuum distillation, which makes it possible to separate a heavy gas oil, various distillate fractions and a vacuum distillation residue. This vacuum distillation residue contains "petroleum pitch" in variable concentration.

It is possible to obtain the "petroleum pitch" according to two processes:

1st Process:

The vacuum distillation residue is subjected to a deasphalting operation by addition of an appropriate solvent, such as propane, which thus makes it possible to precipitate the pitch and to separate it from the light fractions, such as the deasphalted oil.

2nd Process:

The vacuum distillation residue is subjected to solvent extraction, more specifically with furfural. This heterocyclic aldehyde has the distinguishing feature of selectively dissolving aromatic and polycyclic compounds. This process thus makes it possible to remove the aromatic extracts and to recover the "petroleum pitch".

Preferably, the oxidized pitch used according to the invention is obtained by oxidation of a mixture comprising pitch and a diluent, such as a light gasoline, also known as "flux", subjected to an oxidation operation in a blowing tower in the presence of a catalyst, at a fixed temperature and at a given pressure.

For example, oxidized pitches may be manufactured in a blowing unit by passing a stream of air and/or oxygen through a starting pitch. This operation may be performed in the presence of an oxidation catalyst, for example phosphoric acid. Generally, the oxidation is carried out at high temperatures, of the order of 200 to 300° C., for relatively long periods of time typically of between 30 minutes and 2 hours, continuously or batchwise. The period of time and the temperature for oxidation are adjusted as a function of the properties targeted for the oxidized pitch and as a function of the quality of the starting pitch.

According to one embodiment of the invention, the pitch is in the form of pellets before it is introduced into the heated oil. Such an embodiment facilitates the handling of the components and the implementation of the process.

The mechanical qualities of the pitches are generally evaluated by determining a series of mechanical features via standardized tests, the most widely used of which are the needle penetrability expressed in ⅒ mm and the softening point determined by the ring and ball test, also known as the ring and ball softening point (RBSP).

According to one embodiment of the invention, the pitch exhibits a needle penetrability at 25° C. of 0 to 20 ⅒ mm, preferably of 5 to 20 ⅒ mm, it being understood that the penetrability is measured according to the standard EN 1426.

According to one embodiment of the invention, the pitch exhibits a softening point of between 115° C. and 175° C. Among examples of pitches used in the invention, there are pitches respectively exhibiting a softening point of between 115 and 125° C., between 135 and 145° C. or also between 165 and 175° C.

The Clear Binder

For the purposes of the invention, the terms "clear binder" and "clear binder base" are used equivalently and independently of one another.

According to one embodiment of the invention, the clear binder comprises:
i) a plasticizer, for example a natural or synthetic oil, free of asphaltenes,
ii) a structuring agent, for example a hydrocarbon or plant resin,
iii) a polymer,
iv) where appropriate, doping agents, or dopants, or adhesion dopants.

Clear binder compositions are described in the following patent applications and these clear binder compositions can be used as a clear binder base in the present invention.

A clear binder comprising hydrogenated white oils comprising at least 60% of paraffinic carbons (according to the ASTM D2140 method), and a hydrocarbon-based resin, where appropriate mixed with ethylene-vinyl acetate (EVA) copolymers or low density polyethylene, for example of the EPDM (ethylene-propylene-diene-monomer) type, as described in WO 01/53409, may be used as clear binder base.

A clear binder comprising an oil with a naphthenic compound content between 35% and 80% and a hydrocarbon-based resin, as described in EP 1783174, may be used as clear binder base.

A clear binder comprising a synthetic oil, a resin and an SBS or SIS type polymer, as described in EP 1473327, may be used as clear binder base.

As clear binder base, use may be made of a clear binder comprising:
at least one oil of petroleum origin, preferably an aromatic oil comprising aromatic extracts of petroleum residues, obtained by extraction or dearomatization of residues from distillations of petroleum fractions, and
at least one resin of plant origin, preferably chosen from rosin esters, esters of glycerol and rosins, esters of pentaerythritol and rosins, taken alone or as a mixture, as described in WO 2009/150519.

As clear binder base, use may be made of a synthetic clear binder comprising:
at least one oil of plant origin, preferably chosen from rapeseed, sunflower, soybean, linseed, olive, palm, castor, wood, maize, marrow, grapeseed, jojoba, sesame, walnut, hazelnut, almond, shea, macadamia, cottonseed, alfalfa, rye, safflower, groundnut, coconut and coconut kernel oils, and mixtures thereof,
at least one resin of petroleum origin, preferably chosen from resins of hydrocarbon petroleum origin resulting from the copolymerization of aromatic, aliphatic, cyclopentadienic petroleum fractions taken alone or as a mixture, and
at least one polymer, preferably chosen from styrene/butadiene copolymers, styrene/isoprene copolymers, ethylene/propene/diene terpolymers, polychloroprenes, ethylene/vinyl acetate copolymers, ethylene/methyl acrylate copolymers, ethylene/butyl acrylate copolymers, ethylene/methyl acrylate/glycidyl methacrylate terpolymers, ethylene/butyl acrylate/maleic anhydride terpolymers, atactic polypropylenes, taken alone or as mixtures,
the amount of plant oil in the binder being greater than or equal to 10% by weight and the amount of polymer in the binder being less than or equal to 15% by weight, as described in WO 2010/055491.

According to another embodiment of the invention, the clear binder base comprises:
(i) a plasticizer consisting of an oil containing a total content of paraffinic compounds, measured according to the ASTM D2140 method, of at least 50%, preferably at least 60% by weight, more preferentially of between 50% and 90%, preferably between 60% and 80%, and
(ii) a copolymer based on conjugated diene units and monovinyl aromatic hydrocarbon units, for example based on butadiene units and styrene units.

Preferably, the clear binder base preferably comprises (i) from 40% to 80% by weight of plasticizer, (ii) from 20% to 50% by weight of resin, (iii) from 1% to 7% by weight of copolymer; and (iv) optionally from 0.05% to 0.5% by weight of adhesion dopant, for example of amine, relative to the weight of clear binder base.

Advantageously, the clear binder base preferably comprises (i) from 40% to 80% by weight of plasticizer, (ii) from 20% to 50% by weight of resin, (iii) from 1% to 7% by weight of copolymer, and (iv) from 0.05% to 0.5% by weight of adhesion dopant, for example of amine, relative to the weight of clear binder base.

Even more advantageously, the clear binder base comprises (i) from 45% to 70% by weight of plasticizer, (ii) from 25% to 50% by weight of resin, (iii) from 1% to 7% by weight of copolymer; and (iv) optionally from 0.1% and 0.3% by weight of adhesion dopant, relative to the total weight of clear binder base.

Preferably, the clear binder base consists essentially of (i) from 40% to 80% by weight of plasticizer, (ii) from 20% to 50% by weight of resin, (iii) from 1% to 7% by weight of copolymer, relative to the total weight of clear binder base.

Advantageously, the clear binder base essentially consists of (i) from 40% to 80% by weight of plasticizer, (ii) from 20% to 50% by weight of resin, (iii) from 1% to 7% by weight of copolymer and (iv) from 0.05% to 0.5% by weight of adhesion dopant, relative to the total weight of clear binder base.

Even more advantageously, the clear binder base essentially consists of (i) from 45% to 70% by weight of plasticizer, (ii) from 25% to 50% by weight of resin, (iii) from 1% to 7% by weight of copolymer; and (iv) from 0.1% and 0.3% by weight of adhesion dopant, relative to the total weight of clear binder base.

Preferably, the copolymer is a copolymer based on styrene and butadiene units which comprises a weight content of 1,2-butadiene ranging from 5% to 70%.

Preferably, the copolymer is advantageously a copolymer based on styrene and butadiene units which comprises a weight content of 1,2-butadiene ranging from 5% to 70% and a weight content of 1,2-vinyl groups of between 10% and 40%.

For example, said copolymer based on styrene and butadiene units has a weight-average molecular weight of between 10 000 and 500 000, preferably between 50 000 and 200 000 and more preferentially between 50 000 and 150 000 daltons. Preferably, a styrene/butadiene block copolymer or styrene/butadiene/styrene block copolymer will be used.

The clear binder bases according to the invention are advantageously characterized in that they have a color index of less than or equal to 4, preferably less than or equal to 3, as determined according to the ASTM DH4 scale.

In addition, they may advantageously have a ring and ball softening point, determined according to the standard NF EN1427, of between 55° C. and 90° C.

Preferably, the clear binder base according to the invention has a penetrability at 25° C., measured according to the NF EN 1426 standard, of between 10 and 220 1/10 mm, preferably between 30 and 100 1/10 mm, more preferentially between 40 and 80 1/10 mm. Those skilled in the art can modulate the penetrability of the clear binder base notably by judiciously choosing the [structuring agent/plasticizer] weight ratio in the composition of the clear binder base. Indeed, it is known that an increase in this ratio makes it possible to reduce the penetrability at 25° C.

The clear binder bases used in the invention can be prepared, for example, according to the following process comprising the steps of:

(i) mixing the plasticizer, for example the DAO oil, and heating at a temperature of between 140 and 200° C., for example for from 10 minutes to 30 minutes, (ii) adding the structuring agent, for example the hydrocarbon-based resin, mixing and heating at a temperature of between 140 and 200° C., for example for from 30 minutes to 2 hours, (iii) adding the polymer(s), for example SBS, mixing and heating at a temperature of between 140 and 200° C., for example for from 90 minutes to 3 hours, preferably from 90 minutes to 2 hours 30 minutes, iv) optionally adding an adhesion dopant, mixing and heating at a temperature of between 140 and 200° C., for example for from 5 minute to 20 minutes.

The order of steps (i) to (iv) can be modified.

The Oils

The oil can be of any type, it is chosen according to the conditions of the subsequent application.

The oil is used for the formulation of a binder base such as for example a clear binder base, or as a mixture with a bitumen base or with a pitch.

In particular, the oil can be the plasticizer of the clear binder.

For the purposes of the invention, the term "plasticizer of the clear binder" is intended to mean a chemical constituent that makes it possible to thin and reduce the viscosity and the modulus of the clear binder base.

In one embodiment of the invention, the plasticizer of the clear binder is chosen from oils of petroleum origin, oils of plant origin and mixtures thereof.

In one preferred embodiment of the invention, the oils of plant origin are chosen from rapeseed, sunflower, soybean, linseed, olive, palm, castor, wood, maize, marrow, grapeseed, jojoba, sesame, walnut, hazelnut, almond, shea, macadamia, cottonseed, alfalfa, rye, safflower, groundnut, coconut and coconut kernel oils, and mixtures thereof.

Preferably, the oils of plant origin are chosen from rapeseed, sunflower, linseed, coconut and soybean oils, and mixtures thereof.

In one preferred embodiment of the invention, the oils used in the clear binder base are chosen from oils of petroleum origin, in particular aromatic oils, or paraffinic oils, and oils of synthetic origin.

For use as a mixture with a bitumen base or a pitch, the oil is preferably a hydrocarbon-based oil of petroleum origin, a hydrocarbon-based oil of synthetic origin or mixtures thereof.

Preferably, the oil is a hydrocarbon-based oil of petroleum origin. It can be of aromatic or paraffinic type.

According to a first embodiment, the oil is composed of 90% to 100% by weight of at least one hydrocarbon-based oil of petroleum origin, advantageously of 95% to 100%, even better still of 98% to 100%, by weight of at least one hydrocarbon-based oil of petroleum origin. Even more advantageously, the oil consists of a hydrocarbon-based oil or of a mixture of hydrocarbon-based oils of petroleum origin.

In a first embodiment of the invention, the hydrocarbon-based oil of petroleum origin is chosen from aromatic oils.

More preferentially, the aromatic oils have a content of aromatic compounds of between 30% and 95% by weight, advantageously of between 50% and 95% by weight, more advantageously of between 60% and 95% by weight, relative to the total weight of the aromatic oil (SARA: Saturates/Aromatics/Resins/Asphaltenes method).

More preferentially, the aromatic oils have a content of saturated compounds of between 1% and 20% by weight, advantageously of between 3% and 15% by weight, more advantageously of between 5% and 10% by weight (SARA: Saturates/Aromatics/Resins/Asphaltenes method).

More preferentially, the aromatic oils have a content of resin-based compounds of between 1% and 10% by weight, advantageously of between 3% and 5% by weight (SARA: Saturates/Aromatics/Resins/Asphaltenes method).

The contents of saturated, resin-based and aromatic compounds mentioned in the present patent application are determined according to the standard ASTM D2140, as % by weight relative to the weight of the oil.

More preferentially, the aromatic oils have a kinematic viscosity at 100° C. of between 0.1 and 150 mm$^2$/s, advantageously of between 5 and 120 mm$^2$/s, more advantageously of between 7 and 90 mm$^2$/s (ASTM D 445 method).

More preferentially, the aromatic oils have a Cleveland flash point of greater than or equal to 150° C., advantageously of between 150° C. and 600° C., more advantageously of between 200° C. and 400° C. (EN ISO 2592 method).

More preferentially, the aromatic oils have an aniline point of between 20° C. and 120° C., advantageously of between 40° C. and 120° C. (ASTM D611 method).

More preferentially, the aromatic oils have a density at 15° C. of between 400 kg/m$^3$ and 1500 kg/m$^3$, advantageously of between 600 kg/m$^3$ and 1200 kg/m$^3$, more advantageously of between 800 kg/m$^3$ and 1000 kg/m$^3$ (ASTM D4052 method).

According to this advantageous embodiment, the aromatic oil comprises aromatic extracts of petroleum residues, obtained by extraction or dearomatization of residues from distillations of petroleum cuts.

The aromatic extracts are byproducts of the process for the refining of crude oils, obtained in particular from products of the vacuum distillation of atmospheric residues. They result from a simple or from a double extraction of the raffinate upgradable in lubricants, by means of a polar solvent. The different extracts are classified in different categories as a function of their process of production and are as follows:

DAE (Distillate Aromatic Extract) products,
MES (Mild Extract Solvate) products,
TDAE (Treated Distillate Aromatic Extract) products,
RAE (Residual Aromatic Extract) products,
TRAE (Treated Residual Aromatic Extract) products.

For example, the aromatic oils which can be used according to the invention can be chosen from the following products sold by Total under the names: Plaxolene 50® (also sold under the brand name Regenis 50®), Plaxolene TD346® and Plaxolene MS132®.

The respective contents of paraffinic, naphthenic and aromatic compounds depend to a certain extent on the nature of the crude oil which is the source of the aromatic oil and on the refining process used.

For example, Plaxolene 50® or Regenis 50® is an RAE (Residual Aromatic Extract) which has:
- a density at 15° C. of between 980 kg/m³ and 1010 kg/m³ (ASTM D4052 method),
- a (Cleveland) flash point of approximately 230° C. (EN ISO 2592 method),
- a kinematic viscosity at 100° C. of between 60 and 85 mm²/s (ASTM D 445 method),
- an aniline point of between 53 and 65° C. (ASTM D611 method).

For example, Plaxolene TD346® is a TDAE (Treated Distillates Aromatic Extract) which exhibits:
- a density at 15° C. of between 940 kg/m³ and 970 kg/m³ (ASTM D4052 method),
- a (Cleveland) flash point of approximately 220° C. (EN ISO 2592 method),
- a kinematic viscosity at 100° C. of between 16 and 23 mm²/s (ASTM D 445 method),
- an aniline point of between 64 and 72° C. (ASTM D611 method).

For example, Plaxolene MS132® is an MES (Mild Extract Solvate) which exhibits:
- a density at 15° C. of between 895 kg/m³ and 925 kg/m³ (ASTM D4052 method),
- a (Cleveland) flash point of approximately 230° C. (EN ISO 2592 method),
- a kinematic viscosity at 100° C. of between 13 and 17 mm²/s (ASTM D 445 method),
- an aniline point of between 85 and 100° C. (ASTM D611 method).

According to a second advantageous embodiment, the oil is a paraffinic oil predominantly comprising paraffinic extracts of petroleum residues. According to this specific embodiment, advantageously, the oil comprises a total content of paraffinic compounds of at least 50% by weight, preferably of at least 60% by weight, for example of between 50% and 90%, preferably between 60% and 90%, more preferably between 50% and 80% and in particular of between 55% and 75% or in particular of between 60% and 75%.

In a more specific embodiment, the oil additionally contains a total content of naphthenic compounds which does not exceed 25%, for example of between 5% and 25% and in particular of between 10% and 25%.

In a more specific embodiment, the oil additionally contains a total content of aromatic compounds which does not exceed 25%, for example of between 5% and 25% and in particular of between 8% and 18%.

In one particularly preferred form, the oil is a paraffinic oil, comprising the respective contents:
(i) a total content of paraffinic compounds of between 50% and 90%;
(ii) a total content of naphthenic compounds of between 5% and 25%; and
(iii) a total content of aromatic compounds of between 5% and 25%.

In a more particularly preferred embodiment, the oil is a paraffinic oil, comprising the respective contents:
(i) a total content of paraffinic compounds of between 60% and 75%;
(ii) a total content of naphthenic compounds of between 5% and 25%; and
(iii) a total content of aromatic compounds of between 5% and 25%.

In a more preferred embodiment, the oil is a paraffinic oil, comprising the respective contents:
(i) a total content of paraffinic compounds of between 60% and 75%;
(ii) a total content of naphthenic compounds of between 15% and 25%; and
(iii) a total content of aromatic compounds of between 10% and 15%.

In one preferred embodiment of this variant, the paraffinic oils result from the deasphalting cuts from the distillation under reduced pressure (vacuum residue VR) of crude oil (hereinafter denoted "DAO oil"). The principal of deasphalting rests on a separation by precipitation of a petroleum residue into two phases: i) a "deasphalted oil" phase, also known as "oil matrix" or "oil phase" or DAO (DeAsphalted Oil); and ii) an "asphalt" phase.

Oils corresponding to the characteristics below and which can be used according to the invention are obtained by the processes for the deasphalting of the vacuum residues (VRs) resulting from the refining of oil, for example by a deasphalting using a $C_3$ to $C_6$ solvent, preferably with propane. Deasphalting processes are well known to those skilled in the art and are described, for example, in FR 3 014 111, US 2004/0069685, U.S. Pat. Nos. 4,305,812 and 4,455,216 or in Lee et al., 2014, Fuel Processing Technology, 119, 204-210.

In Lee et al., 2014, Fuel Processing Technology, 119, 204-210, the residues resulting from the vacuum distillation (VRs) are separated according to their molecular weight in the presence of $C_3$ to $C_6$ solvent (for example propane). The "DAO" oil thus obtained is rich in paraffin, exhibits a very low content of asphaltenes, has an evaporation temperature of between 440° C. and 750° C. and has a much greater API gravity than that of the vacuum residues The API (American Petroleum Institute) gravity or API density of an oil can be obtained from the following formula (1):

$$G_{API} = \frac{141.5}{d} - 131.5$$

with:
$G_{API}$, the API gravity of the oil under consideration (expressed without unit), and
d, the density at 16° C. (60° F.) of the oil under consideration (expressed without unit), taking water as reference.

The respective contents of paraffinic, naphthenic and aromatic compounds depend to a certain extent on the nature of the crude oil which is the source of the DAO oil and on the refining process used. Those skilled in the art know how to determine the respective contents of paraffinic, naphthenic and aromatic compounds of a DAO oil, for example using the SARA fractionation method, also described in Lee et al., 2014, Fuel Processing Technology, 119, 204-210, and to thus select the DAO oil appropriate for the preparation of the gelled oil composition according to the invention.

The contents of paraffinic, naphthenic and aromatic compounds mentioned in the present patent application are determined according to the standard ASTM D2140, as % by weight relative to the weight of the oil.

In a third embodiment of the invention, the hydrocarbon-based oil of petroleum origin is a mixture of aromatic oils as described above and paraffinic oils as described above.

The Plasticizer of the Clear Binder

For the purposes of the invention, the term "plasticizer of the clear binder" is intended to mean a chemical constituent that makes it possible to thin and reduce the viscosity and the modulus of the clear binder base.

In one embodiment of the invention, the plasticizer of the clear binder is chosen from oils of petroleum origin, oils of plant origin and mixtures thereof.

In one preferred embodiment of the invention, the oils of plant origin are chosen from rapeseed, sunflower, soybean, linseed, olive, palm, castor, wood, maize, marrow, grapeseed, jojoba, sesame, walnut, hazelnut, almond, shea, macadamia, cottonseed, alfalfa, rye, safflower, groundnut, coconut and coconut kernel oils, and mixtures thereof.

Preferably, the oils of plant origin are chosen from rapeseed, sunflower, linseed, coconut and soybean oils, and mixtures thereof.

In one preferred embodiment of the invention, the oils used in the clear binder base are chosen from oils of petroleum origin, in particular aromatic oils, or paraffinic oils, and oils of synthetic origin. The hydrocarbon-based oils of petroleum origin and the preferred variants thereof for use as a plasticizer of the clear binder are described above in the section "The oils".

The Structuring Agent of the Clear Binder

The term "structuring agent of the clear binder" is intended to mean any chemical constituent imparting mechanical properties and satisfactory cohesiveness to the clear binder base.

The structuring agent used in the clear binder base is a resin, preferably chosen from resins of hydrocarbon petroleum origin or of plant origin.

According to one embodiment, the resins of plant origin are chosen from rosin esters such as rosin methyl esters, esters of glycerol and rosins, esters of pentaerythritol and rosins, and mixtures thereof.

According to one embodiment, the resins of plant origin are obtained from vegetables and/or plants. They can be from a harvest, that is to say harvested from the living plant. They can be used as they are, the term "natural resins" is then used, or they can be chemically converted, the term "modified natural resins" is then used.

Among the harvest resins are acaroid resins, dammar, natural rosins, modified rosins, rosin esters and metal resinates. These may be taken alone or as a mixture.

Among the natural rosins, mention may be made of gum and wood rosins, in particular pine rosin, and/or tall oil rosin. These natural rosins may be taken alone or as a mixture.

Among the modified rosins, mention may be made of hydrogenated rosins, disproportionated rosins, polymerized rosins and/or maleinized rosins. These modified natural rosins may be taken alone or as a mixture, and may undergo one or more disproportionation, polymerization and/or maleinization treatments.

Among the rosin esters, mention may be made of methyl esters of natural rosins, methyl esters of hydrogenated rosins, esters of glycerol and of natural rosins, esters of glycerol and hydrogenated rosins, esters of glycerol and of disproportionated rosins, esters of glycerol and of polymerized rosins, esters of glycerol and of maleinized rosins, esters of pentaerythritol and of natural rosins and esters of pentaerythritol and of hydrogenated rosins. These rosin esters can be taken alone or as a mixture and come from rosins having undergone one or more disproportionation, polymerization and/or maleinization treatments.

Esters of pentaerythritol and of natural rosins and esters of pentaerythritol and of hydrogenated rosins are the preferred rosin esters.

Among the metal resinates, mention may be made of metal carboxylates, for example of Ca, Zn, Mg, Ba, Pb or Co, obtained from natural rosins or from modified rosins. Calcium resinates, zinc resinates, mixed calcium/zinc resinates, taken alone or as a mixture, are preferred.

For more information on resins of plant origin that can be used in the clear binder bases, reference may be made to Bernard Delmond's article K340 published in the "Techniques de l'ingénieur".

Preferably, the resins of plant origin have a softening temperature of between 60° C. and 200° C., preferably between 80° C. and 150° C., more preferably between 90° C. and 110° C.

Preferably, the resins of plant origin have an acid number of between 2 mg and 25 mg, preferably between 5 mg and 20 mg, more preferentially between 6 mg and 16 mg.

The hydrocarbon-based resins of petroleum origin are derived from the copolymerization of aromatic, aliphatic, cyclopentadienic petroleum fractions, taken alone or as a mixture, preferably derived from aromatic petroleum fractions. For example, it may be a polycycloaliphatic thermoplastic resin, for example of the low molecular weight hydrogenated cyclopentadiene homopolymer type.

More particularly, the hydrocarbon resin of the cyclopentane type has a softening point (or ring-and-ball temperature, RBT, according to the NF T 66-008 standard) of greater than 125° C., and a Gardner color index (according to the NF T 20-030 standard) equal to at most 1.

The Polymer

The polymer can be part of the composition of clear binder bases and bitumen bases or pitch bases.

According to one embodiment of the invention, the binder base may comprise known elastomers, such as the copolymers SB (styrene/butadiene block copolymer), SBS (styrene/butadiene/styrene block copolymer), SIS (styrene/isoprene/styrene), SBS* (star-branched styrene/butadiene/styrene block copolymer), SBR (styrene-b-butadiene rubber) or EPDM (modified ethylene propylene diene). These elastomers may also be cross-linked according to any known process, for example with sulfur. Mention may also be made of elastomers prepared from styrene monomers and butadiene monomers allowing crosslinking without a crosslinking agent, as described in WO 2007/058994 and WO 2008/137394 and by the Applicant in patent application WO 11/013073.

Advantageously, the elastomer used in the process for preparing the binder base is a copolymer based on conjugated diene units and on monovinyl aromatic hydrocarbon units. The conjugated diene is preferably chosen from those comprising from 4 to 8 carbon atoms per monomer, for example butadiene, 2-methyl-1,3-butadiene (isoprene), 2,3-dimethyl-1,3-butadiene, 1,3-pentadiene and 1,2-hexadiene, chloroprene, carboxylated butadiene, carboxylated isoprene, in particular butadiene and isoprene, and mixtures thereof.

The monovinyl aromatic hydrocarbon is preferably chosen from styrene, o-methylstyrene, p-methylstyrene, p-tert-butylstyrene, 2,3-dimethylstyrene, p-methylstyrene, vinylnaphthalene, vinyltoluene, vinylxylene, and the like or mixtures thereof, in particular styrene.

More particularly, the polymer consists of one or more copolymers chosen from block copolymers of styrene and butadiene, of styrene and isoprene, of styrene and chloroprene, of styrene and carboxylated butadiene or of styrene and carboxylated isoprene. A preferred copolymer is a copolymer based on butadiene units and styrene units such as the SB styrene/butadiene block copolymer or the SBS styrene/butadiene/styrene block copolymer.

The styrene/conjugated diene copolymer, in particular the styrene/butadiene copolymer, advantageously has a weight content of styrene ranging from 5% to 50%, preferably from 20% to 50%.

The styrene/conjugated diene copolymer, in particular the styrene/butadiene copolymer, advantageously has a weight content of butadiene (1,2- and 1,4-) ranging from 50% to 95%. The styrene/conjugated diene copolymer, in particular the styrene/butadiene copolymer, advantageously has a content by weight of 1,2-butadiene ranging from 5% to 70%, preferably from 5% to 50%. The 1,2-butadiene units are the units which result from polymerization via the 1,2 addition of butadiene units.

The weight-average molecular weight of the styrene/conjugated diene copolymer, and in particular that of the styrene/butadiene copolymer, may be, for example, between 10 000 and 500 000, preferably between 50 000 and 200 000 and more preferentially from 50 000 to 150 000 daltons.

In one specific embodiment, the clear binder base does not comprise polymer of the ethylene-vinyl acetate (EVA) type or of the low density polyethylene type, such as EPDM (ethylene-propylene-diene monomer) or EPM (ethylene-propylene monomer).

The Adhesion Dopants

The adhesion dopants can be used in all binder bases to be mixed with aggregates, to improve the mutual affinity between the binder and the aggregates and to ensure its durability. These are, for example, nitrogen-containing surfactant compounds derived from fatty acids (amines, polyamines, alkylpolymanne, etc.).

The Coloring Agents

The coloring agents are intended for the coloring of the binder bases, in particular all binders devoid of bituminous compounds or pitch, such as clear binder bases. The synthetic clear binder may also comprise one or more coloring agents, such as mineral pigments or organic dyes. The pigments are selected according to the shade and the color desired for the coating. For example, metal oxides such as iron oxides, chromium oxides, cobalt oxides or titanium oxides will be used to obtain the colors red, yellow, gray, blue-green or white. The pigments can be added either to the clear binder base or to the bituminous mix (as a mixture with the aggregates for example) or to an emulsion of the clear binder.

The Acid Compound

The acid compound is a compound of general formula (I):

$$R\text{---}(COOH)_z \qquad (I)$$

wherein R represents a linear or branched, saturated or unsaturated chain comprising from 4 to 68 carbon atoms, preferably from 4 to 54 carbon atoms, more preferentially from 4 to 36 carbon atoms and z is an integer ranging from 2 to 4.

Preferably, the group R is a saturated linear chain of formula $C_wH_{2w}$ with w being an integer ranging from 4 to 22, preferably from 4 to 12.

The organic compounds corresponding to formula (I) may be diacids (z=2), triacids (z=3) or tetracids (z=4). The preferred organic compounds according to this alternative form are diacids with z=2.

Preferably, the diacids have the general formula HOOC—$C_wH_{2w}$—COOH with w being an integer ranging from 4 to 22, preferably from 4 to 12 and wherein z=2 and R"=$C_wH_{2w}$.

Advantageously, the organic compound is a diacid chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

Advantageously, the compound (I) is sebacic acid.

The diacids can also be diacid dimers of unsaturated fatty acid(s), that is to say dimers formed from at least one unsaturated fatty acid, for example from a single unsaturated fatty acid or from two different unsaturated fatty acids. Diacid dimers of unsaturated fatty acid(s) are conventionally obtained by an intermolecular dimerization reaction of at least one unsaturated fatty acid (Diels-Alder reaction, for example). Preferably, a single type of unsaturated fatty acid is dimerized. They are derived in particular from the dimerization of an unsaturated fatty acid, such as $C_8$ to $C_{34}$, especially $C_{12}$ to $C_{22}$, in particular $C_{16}$ to $C_{20}$ and more particularly $C_{18}$ acids. A preferred fatty acid dimer is obtained by dimerization of linoleic acid, it being possible for the dimer to be subsequently partially or completely hydrogenated. Another preferred fatty acid dimer has the formula HOOC—$(CH_2)_7$—CH=CH—$(CH_2)_7$—COOH Another preferred fatty acid dimer is obtained by dimerization of methyl linoleate. In the same way, it is possible to find triacids of fatty acids and tetracids of fatty acids, obtained respectively by trimerization and tetramerization of at least one fatty acid.

Preferably, the compound of formula (I) is present in the binder composition in an amount ranging from 0.1% to 5% by weight, relative to the total weight of the binder composition, preferably from 0.5% to 4.5% by weight, even better still from 1% to 4% by weight.

The Amide Compound

The amide compound is a compound of general formula (II):

$$R'\text{---}(NH)_n CONH\text{---}(X)_m\text{---}(NHCO)_p(NH)_n\text{---}R'' \qquad (II)$$

wherein:
the R' and R" groups, which may be identical or different, represent a saturated or unsaturated and linear, branched or cyclic hydrocarbon-based chain comprising from 1 to 22 carbon atoms which optionally comprises heteroatoms, such as N, O or S, $C_5$-$C_{24}$ hydrocarbon-based rings and/or $C_4$-$C_{24}$ hydrocarbon-based heterocycles comprising one or more heteroatoms, such as N, O or S, and R" may be H;
the X group represents a saturated or unsaturated and linear, cyclic or branched hydrocarbon-based chain comprising from 1 to 22 carbon atoms which is optionally substituted and which optionally comprises heteroatoms, such as N, O or S, $C_5$-$C_{24}$ hydrocarbon-based rings and/or C$_4$-C$_{24}$ hydrocarbon-based heterocycles comprising one or more heteroatoms, such as N, O or S;

n, m and p are integers having a value of 0 or 1, independently of one another.

When the integer m has a value of 0, and when the integer p has a value of 1, then the R'—(NH)$_n$CONH— and —NHCO(NH)$_n$—R" groups are covalently linked and form a hydrazide bond CONH—NHCO. The R' group, or the R" group, then comprises at least one group chosen from: a hydrocarbon-based chain of at least 4 carbon atoms, preferably comprising from 4 to 22 carbon atoms, an aliphatic ring of 3 to 8 atoms, an aliphatic, partially aromatic or totally aromatic fused polycyclic system, each ring comprising 5 or 6 atoms.

When the integer m has a value of 1, then the R' group, and/or the R" group and/or the X group, comprises at least one group chosen from: a hydrocarbon-based chain comprising from 1 to 22 carbon atoms, an aliphatic ring of 3 to 8 atoms, an aliphatic, partially aromatic or totally aromatic fused polycyclic system, each ring comprising 5 or 6 atoms.

Preferably, the R' and/or R" group comprises an aliphatic hydrocarbon-based chain of 4 to 22 carbon atoms, in particular chosen from the C$_4$H$_9$, C$_5$H$_{11}$, C$_9$H$_{19}$, C$_{11}$H$_{23}$, C$_{12}$H$_{25}$, C$_{17}$H$_{35}$, C$_{18}$H$_{37}$, C$_{21}$H$_{43}$ and C$_{22}$H$_{45}$ groups.

Preferably, the X group represents a saturated linear hydrocarbon-based chain comprising from 1 to 22 carbon atoms; advantageously, X represents a saturated linear hydrocarbon-based chain comprising from 1 to 12 carbon atoms and better still from 1 to 4 carbon atoms. Preferably, the X group is chosen from C$_2$H$_4$ and C$_3$H$_6$ groups.

The X group can also be a cyclohexyl group or a phenyl group; the R'—(NH)$_n$CONH— and —NHCO(NH)$_n$—R" radicals can then be in the ortho, meta or para position. Moreover, the R'—(NH)$_n$CONH— and NHCO(NH)$_n$—R" radicals can be in the cis or trans position with respect to one another. Furthermore, when the X radical is cyclic, this ring can be substituted by groups other than the two main groups R'—(NH)$_n$CONH— and —NHCO(NH)$_n$—R".

Preferably, according to this variant, the X group comprises two rings of 6 carbons bonded via a CH$_2$ group, these rings being aliphatic or aromatic. In this case, the X group is a group comprising two aliphatic rings connected by an optionally substituted CH$_2$ group, for example:

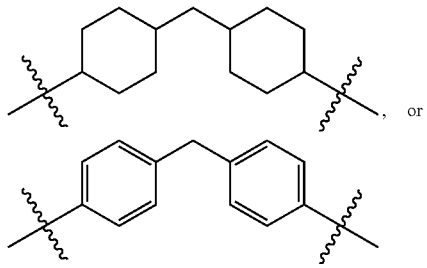

As an example of this variant, mention may be made of ureide derivatives such as 4,4'-bis(dodecylaminocarbonylamino)diphenylmethane of formula C$_{12}$H$_{25}$—NHCONH—C$_6$H$_4$—CH$_2$—C$_6$H$_4$—NHCONH—C$_{12}$H$_{25}$.

Preferably, the compound of general formula (II) is chosen from those which satisfy the condition: n=0.

Preferably, the compound of general formula (II) is chosen from those which satisfy the condition: the sum of the numbers of the carbon atoms of R', X and R" is greater than or equal to 10, advantageously greater than or equal to 14, preferably greater than or equal to 18.

Preferably, the compound of general formula (II) is chosen from those which satisfy the condition: the number of carbon atoms of at least one from among R' and R" is greater than or equal to 10, advantageously greater than or equal to 12, preferably greater than or equal to 14.

Preferably, according to a first variant, the compound of general formula (II) is chosen from those of formula (IIA):

R'—CONH—(X)$_m$—NHCO—R"　　　(IIA)

wherein R', R", m and X have the same definition as above.

Preferably, in the formula (IIA), when m=1, the X group represents a saturated linear hydrocarbon-based chain comprising from 1 to 22 carbon atoms; advantageously, X represents a saturated linear hydrocarbon-based chain comprising from 1 to 12 carbon atoms and better still from 1 to 4 carbon atoms. Preferably, the X group is chosen from the C$_2$H$_4$ and C$_3$H$_6$ groups.

Preferably, the compound of general formula (IIA) is chosen from those which satisfy the condition: the sum of the numbers of the carbon atoms of R', X and R" is greater than or equal to 10, advantageously greater than or equal to 14, preferably greater than or equal to 18.

Preferably, the compound of general formula (IIA) is chosen from those which satisfy the condition: the number of carbon atoms of at least one from among R' and R" is greater than or equal to 10, advantageously greater than or equal to 12, preferably greater than or equal to 14.

Preferably, according to a second variant, the compound of general formula (II) is chosen from those of formula (IIB):

R'—CONH—R"　　　(IIB)

wherein R' and R" have the same definition as above.

Advantageously, according to this variant, the sum of the numbers of the carbon atoms of R' and R" is greater than or equal to 10, advantageously greater than or equal to 14, preferably greater than or equal to 18.

Even more advantageously, according to this variant, the number of carbon atoms of R is greater than or equal to 10, advantageously greater than or equal to 12, preferably greater than or equal to 14, and R"=H.

Advantageously, the compound of general formula (II) is chosen from hydrazide derivatives, such as the compounds C$_5$H$_{11}$—CONH—NHCO—C$_5$H$_{11}$, C$_9$H$_{19}$—CONH—NHCO—C$_9$H$_{19}$, C$_{11}$H$_{23}$—CONH—NHCO—C$_{11}$H$_{23}$, C$_{17}$H$_{35}$—CONH—NHCO—C$_{17}$H$_{35}$ or C$_{21}$H$_{43}$—CONH—NHCO—C$_{21}$H$_{43}$, diamides, such as N,N'-ethylenedi(laurylamide) of formula C$_{11}$H$_{23}$—CONH—CH$_2$—CH$_2$—NHCO—C$_{11}$H$_{31}$, N,N'-ethylenedi(myristylamide) of formula C$_{13}$H$_{27}$—CONH—CH$_2$—CH$_2$—NHCO—C$_{13}$H$_{27}$, N, N'-ethylenedi(palmitamide) of formula C$_{15}$H$_{31}$—CONH—CH$_2$—CH$_2$—NHCO—C$_{15}$H$_{31}$ or N,N'-ethylenedi(stearamide) of formula C$_{17}$H$_{35}$—CONH—CH$_2$—CH$_2$—NHCO—C$_{17}$H$_{35}$; monoamides, such as laurylamide of formula C$_{11}$H$_{23}$—CONH$_2$, myristylamide of formula C$_{13}$H$_{27}$—CONH$_2$, palmitamide of formula C$_{15}$H$_{31}$—CONH$_2$ or stearamide of formula C$_{17}$H$_{35}$—CONH$_2$.

Even more advantageously, the compound of general formula (II) is N,N'-ethylenedi(stearamide) of formula C$_{17}$H$_{35}$—CONH—CH$_2$—CH$_2$—NHCO—C$_{17}$H$_{35}$.

Preferably, the compound of formula (II) is present in the binder composition in an amount ranging from 0.1% to 5% by weight, relative to the total weight of the binder composition, preferably from 0.5% to 4.5% by weight, even better still from 1% to 4% by weight.

Binder Composition

According to the invention, the weight ratio of the compounds (I) and (II) in the binder composition is from 10:1 to 1:16.

Advantageously, the weight ratio of the compounds (I) and (II) is from 5:1 to 1:9.

According to a first embodiment of the invention, the sum of the weights of the additives of formula (I) and of formula (II) represents from 0.5% to 12% by weight, preferably from 1% to 8% by weight. more preferentially from 1.2% to 5% by weight relative to the total weight of the binder composition.

According to another embodiment of the invention, the supplemented binder composition according to the invention is a concentrated binder composition. In this case, before its use, for example in an application described below, the concentrated supplemented binder composition is melted and then diluted with at least one other non-supplemented binder composition. This dilution is calculated to reach an additive content, i.e. a sum of the weights of the additives (I) and (II), which represents from 0.5% to 12% by weight, preferably from 1% to 8% by weight, more preferentially from 1.2% to 5% by weight, relative to the total weight of the binder composition.

According to this embodiment, the sum of the weights of the additives of formula (I) and of formula (II) represents from 5% to 30% by weight, preferably from 6% to 28% by weight. more preferentially from 7% to 26% by weight relative to the total weight of said concentrated binder composition.

Preferably, the binder composition also comprises between 0.5% and 20% by weight, preferably between 2% and 20% by weight, more preferentially between 4% and 15% by weight of at least one anticaking agent, relative to the total weight of the binder composition.

The binder compositions are prepared from at least one binder base, said compositions being prepared by bringing into contact:
at least one binder base chosen from bitumen bases, pitch bases, clear binders or mixtures thereof,
between 0.1% and 5% by weight, preferably between 0.5% and 4.5% by weight, more preferentially between 1% and 4% by weight of an additive (I), relative to the total weight of the binder composition,
between 0.1% and 5% by weight, preferably between 0.5% and 4.5% by weight, more preferentially between 0.5% and 4% by weight of at least one additive (II), relative to the total weight of the binder composition,
optionally between 0.5% and 20% by weight, preferably between 2% and 20% by weight, more preferentially between 4% and 15% by weight of at least one anticaking agent, relative to the total weight of the binder composition,
the weight ratio of the compounds (I) and (II) being from 10:1 to 1:16.

Advantageously, the binder composition comprises, or essentially consists of:
from 99.8% to 90% by weight of at least one binder base chosen from bitumen bases, pitch bases, clear binders or mixtures thereof,
from 0.1% to 5% by weight, relative to the total weight of the binder composition, of at least one additive (I),
from 0.1% to 5% by weight, relative to the total weight of the binder composition, of at least one additive (II),
and the weight ratio of the compounds (I) and (II) in the binder composition is from 10:1 to 1:16.

Even more advantageously, the binder composition comprises, or essentially consists of:
from 99% to 91% by weight of at least one binder base chosen from bitumen bases, pitch bases, clear binders or mixtures thereof,
from 0.5% to 4.5% by weight, relative to the total weight of the binder composition, of at least one additive (I),
from 0.5% to 4.5% by weight, relative to the total weight of the binder composition, of at least one additive (II),
and the weight ratio of the compounds (I) and (II) in the binder composition is from 5:1 to 1:9.

According to one embodiment, the binder composition comprises, or essentially consists of:
from 99.3% to 70% by weight of at least one binder base chosen from bitumen bases, pitch bases, clear binders or mixtures thereof,
from 0.1% to 5% by weight, relative to the total weight of the binder composition, of at least one additive (I),
from 0.1% to 5% by weight, relative to the total weight of the binder composition, of at least one additive (II),
from 0.5% to 20% by weight, preferably from 2% to 20% by weight, more preferentially from 4% to 15% by weight of at least one anticaking agent, relative to the total weight of the binder composition,
and the weight ratio of the compounds (I) and (II) in the binder composition is from 10:1 to 1:16.

Advantageously, the binder composition is in a form that is solid under cold conditions and divided, for instance in the form of binder pellets or binder blocks.

The Anticaking Compound

Optionally, as set out above, the binder composition may comprise one or more anticaking compounds.

According to another embodiment, optionally, the binder composition, when in divided form that is solid under cold conditions, such as for example in the form of binder pellets or binder blocks, can be optionally coated with one or more anticaking compounds.

The anticaking compound is of mineral or organic origin. The term "anticaking agent" or "anticaking compound" is intended to mean any compound which limits, reduces, inhibits, delays, the agglomeration and/or the adhesion of the pellets together during their transportation and/or their storage at ambient temperature and which ensures their fluidity during handling.

Preferentially, the anticaking compound is chosen from: talc; fines, also known as "fillers", generally less than 125 µm in diameter, such as siliceous fines, with the exception of limestone fines; ultrafines; sand such as Fontainebleau sand; cement; cementitious products such as fly ash, blast furnace slags; carbon; wood residues such as lignin, lignosulfonate, conifer needle powders, conifer cone powders, especially pine cone powders; rice husk ash; glass powder; clays such as kaolin, bentonite, vermiculite; alumina such as alumina hydrates; silica; silica derivatives such as silicates, silicon hydroxides and other silicon oxides; fumed silicas, in particular hydrophilic or hydrophobic fumed silicas; pyrogenic silicas, in particular hydrophobic or hydrophilic pyrogenic silicas; coloring agents; plastic powder; lime; plaster; crumb rubber; polymer powder, wherein the polymers are such as styrene/butadiene (SB) copolymers, styrene/butadiene/styrene (SBS) copolymers, and mixtures of these materials.

Advantageously, the anticaking compound is chosen from: fines, generally less than 125 µm in diameter; wood residues such as lignin, conifer needle powders and conifer cone powders; fumed silicas, in particular hydrophilic or hydrophobic fumed silicas; pyrogenic silicas, in particular hydrophobic or hydrophilic pyrogenic silicas; mixtures thereof.

The anticaking compound is preferably chosen from fumed silicas.

In particular, when the binder composition comprises at least one anticaking compound, it is preferably chosen from fumed silicas.

When the binder composition in divided form that is solid under cold conditions is coated with at least one anticaking compound, said anticaking compound is also preferably chosen from fumed silicas.

According to one embodiment, the clear binder composition in divided form that is solid under cold conditions according to the invention comprises an anticaking compound, preferably chosen from fumed silicas, and is coated with at least one anticaking compound, preferably chosen from fumed silicas.

For the purposes of the invention, the "fumed silica" and "pyrogenic silica" compounds have the same chemical definition and are recorded under the same number CAS 112 945-52-5. Consequently, for the purposes of the invention, these compounds can be employed without distinction from one another.

The term "pyrogenic silica" is understood to mean either a pyrogenic silica or a pyrogenic silica derivative.

The term "pyrogenic silica" is understood to mean a compound obtained by the vapor-phase hydrolysis of chlorosilanes, such as silicon tetrachloride, in a flame of oxygen and hydrogen. Such processes are generally termed pyrogenic processes, the overall reaction of which is: $SiCl_4+H_2+O_2 \rightarrow SiO_2+4\ HCl$.

Pyrogenic silicas are distinguished from the other silicon dioxides in that they exhibit an amorphous structure. These silicas, of high purity (>99.8% silica), have a weak hydrophilic nature (no microporosity).

Preferably, the pyrogenic silica compound is pyrogenic silica.

According to one embodiment of the invention, the pyrogenic silica compound exhibits a specific surface area of between 25 and 420 $m^2/g$, preferably between 90 and 330 $m^2/g$, more preferably between 120 and 280 $m^2/g$.

The specific surface area of the pyrogenic silica, defined in $m^2/g$, commonly known as "surface area" or "SA", is measured according to the method of S. Brunauer, P. H. Emmett and I. Teller, J. Am. Chemical Society, 60, 309 (1938) (BET).

According to one embodiment of the invention, the pyrogenic silica compound exhibits a mean particle size of between 5 and 50 nm.

According to one embodiment of the invention, the pyrogenic silica compound exhibits a pH of between 3 and 10, when it is in the aqueous phase.

According to one embodiment of the invention, the pyrogenic silica compound exhibits a carbon content of between 0.1% and 10% by weight, relative to the total weight of the pyrogenic silica compound.

According to one embodiment of the invention, the pyrogenic silica compound is chosen from a hydrophilic pyrogenic silica compound, a hydrophobic pyrogenic silica compound and mixtures thereof.

Preferably, the pyrogenic silica compound is a hydrophilic pyrogenic silica compound.

The term "hydrophilic" is intended to mean a compound which is miscible with water in all proportions.

The pyrogenic silica compound, or pyrogenic silica derivative, used within the meaning of the invention can be chemically modified.

Various types of pyrogenic silica compounds are described in the following patent applications and can be used in the present invention:

silanized pyrogenic silicas, as described in WO 2004/020532 or in WO 2007/128636, hydrophilic pyrogenic silicas, as described in WO 2009/071467 and WO 2011/000133, filed in the name of Degussa AG or Degussa GmbH, fumed silicas rendered hydrophobic by a treatment using polysiloxanes, as described in WO 2008/141932, or by silanization, as described in WO 2008/141930, silicas doped with potassium oxide, as described in WO 2008/043635 and WO 2008/022836, silicas in the form of aggregates of primary particles, as described in WO 2009/015969, filed in the name of Evonik Degussa GmbH, or in WO 2010/028261, filed in name of Cabot Corporation.

When the binder composition in divided form that is solid under cold conditions is coated with at least one pyrogenic silica compound, the latter can then be used alone or in the form of a mixture within a coating composition.

Whether it is employed alone or as a mixture in a coating composition, the pyrogenic silica compound can be employed in the process according to the invention in the form of a powder or as a dispersion in a solvent which evaporates after application.

Preferably, when the coating composition comprises at least one pyrogenic silica compound and at least one solvent, the coating composition comprises from 5% to 70% by weight of pyrogenic silica compound relative to the total weight of the coating composition, more preferentially from 20% to 40% by weight.

Preferably, the solvent is an organic solvent or water. The term "organic solvent" is intended to mean any solvent which is immiscible with a bitumen, such as an alcohol, for example ethanol.

The fumed silicas used in the invention are commercially available and for example may be sold by Evonik Degussa under the brand name Aerosil®, such as for example Aerosil®200, by Cabot Corporation under the brand-names CAB-O-s IL® and CAB-O-SPERSE® or else by Wacker Chemie AG under the brand name HDK®.

Preferably, the weight of the anticaking agent covering at least a portion of the surface of the binder pellets or binder blocks is between 0.2% and 10% by weight, preferably between 0.5% and 8% by weight, more preferentially between 0.5% and 5% relative to the total weight of binder of said pellets or said blocks.

Advantageously, the weight of the anticaking agent covering at least a portion of the surface of the binder pellets or binder blocks is approximately 1% by weight relative to the total weight of binder of said pellets or of said blocks.

The anticaking layer covering the binder pellets or binder blocks is preferably continuous so that at least 90% of the surface of the binder pellet or binder block is covered with at least one anticaking agent, preferably at least 95%, more preferably at least 99% of the surface.

The average thickness of the anticaking layer is preferably greater than or equal to 20 µm, more preferentially between 20 and 100 µm. The anticaking layer must be sufficiently thick so that it is continuous.

The binder pellets or binder blocks are covered with the anticaking agent according to any known process, for example according to the process described in U.S. Pat. No. 3,026,568.

Olefinic Polymer Adjuvant

According to one embodiment of the invention, the supplemented binder composition may also comprise at least one olefinic polymer adjuvant.

The olefinic polymer adjuvant is preferably chosen from the group consisting of (a) ethylene/glycidyl (meth)acrylate copolymers; (b) ethylene/monomer A/monomer B terpolymers and (c) copolymers resulting from the grafting of a monomer B to a polymer substrate.

(a) The ethylene/glycidyl (meth)acrylate copolymers are advantageously chosen from random or block, preferably random, copolymers of ethylene and of a monomer chosen from glycidyl acrylate and glycidyl methacrylate, comprising from 50% to 99.7% by weight, preferably from 60% to 95% by weight, more preferentially from 60% to 90% by weight, of ethylene.

(b) The terpolymers are advantageously chosen from random or block, preferably random, terpolymers of ethylene, of a monomer A and of a monomer B.

Monomer A is chosen from vinyl acetate and $C_1$ to $C_6$ alkyl acrylates or methacrylates.

The monomer B is chosen from glycidyl acrylate and glycidyl methacrylate.

The ethylene/monomer A/monomer B terpolymers comprise from 0.5% to 40% by weight, preferably from 5% to 35% by weight and more preferentially from 10% to 30% by weight of units derived from monomer A, and from 0.5% to 15% by weight and preferably from 2.5% to 15% by weight of units derived from monomer B, the remainder being formed from units derived from ethylene.

(c) The copolymers result from the grafting of a monomer B chosen from glycidyl acrylate and glycidyl methacrylate onto a polymer substrate. The polymer substrate consists of a polymer chosen from polyethylenes, especially low-density polyethylenes, polypropylenes, random or block, preferably random, copolymers of ethylene and of vinyl acetate, and random or block, preferably random, copolymers of ethylene and of $C_1$ to $C_6$ alkyl acrylate or methacrylate, comprising from 40% to 99.7% by weight and preferably from 50% to 99% by weight of ethylene. Said grafted copolymers comprise from 0.5% to 15% by weight and preferably from 2.5% to 15% by weight of grafted units derived from monomer B.

Advantageously, the olefinic polymer adjuvant is chosen from random terpolymers of ethylene (b), of a monomer A chosen from $C_1$ to $C_6$ alkyl acrylates or methacrylates and of a monomer B chosen from glycidyl acrylate and glycidyl methacrylate, comprising from 0.5% to 40% by weight, preferably from 5% to 35% by weight, more preferably from 10% to 30% by weight, of units resulting from the monomer A and from 0.5% to 15% by weight, preferably from 2.5% to 15% by weight, of units resulting from the monomer B, the remainder being formed of units resulting from ethylene.

Binder Pellets

The term "binder pellets" can also be defined as a binder that is solid at ambient temperature, packaged in a divided form, that is to say in the form of small units called pellets or particles.

The binder pellets are obtained by forming a binder composition as described above according to any known process, for example according to the manufacturing process described in document U.S. Pat. No. 3,026,568, document U.S. Pat. No. 4,279,579, document WO 2009/153324 or document WO 2012/168380. According to one particular embodiment, the forming of the pellets can be carried out by draining, in particular using a drum.

Other techniques can be used in the process for manufacturing the binder pellets, in particular molding, extrusion or granulation.

Preferably, the binder pellets may have, within the same population of pellets, one or more shapes chosen from a cylindrical, spherical or ovoid shape. The size of the binder pellets is such that the longest mean dimension is preferably less than or equal to 50 mm, more preferentially from 3 to 30 mm and even more preferentially from 4 to 20 mm. The size and shape of the binder pellets may vary according to the manufacturing process employed. For example, the use of a die makes it possible to control the manufacture of pellets of a chosen size. Screening makes it possible to select pellets as a function of their size.

Preferably, the binder pellets according to the invention have a weight of between 0.1 g and 50 g, preferably between 0.2 g and 10 g and more preferentially between 0.2 g and 5 g.

The binder pellets are preferably transported and/or stored in bulk in bags of 0.5 g to 30 kg or 500 kg to 1000 kg commonly known as "Big Bags" in the road binder field, said bags being preferably made of a hot-melt material, or in cartons of 5 kg to 30 kg or in drums of 100 kg to 200 kg.

According to another embodiment of the invention, the size of the binder pellets is such that the longest average dimension is preferably less than 20 mm, more preferentially less than 10 mm, even more preferentially less than 5 mm.

According to one embodiment of the invention, the binder pellets are covered on at least a portion of their surface with an anticaking agent as described above, preferably over their entire surface.

According to one embodiment of the invention, the binder pellets are covered on at least one portion of their surface with a coloring agent as described above, such as, for example, a pigment, preferably on all of their surface.

According to one embodiment of the invention, the anticaking agent and/or the coloring agent included in the binder forming the binder pellets may be identical to or different than the anticaking agent and/or the coloring agent covering at least a portion of the surface of said binder pellets.

Binder Pellets with a Core/Shell Structure

According to one embodiment of the invention, the binder pellets comprise a core and a coating layer wherein:
   the core comprises at least one binder composition as defined above, and
   the coating layer comprises at least one viscosifying compound and at least one anticaking compound as defined above.

The term "coating layer" is intended to mean that the coating layer covers at least 90% of the surface of the core, preferably at least 95% of the surface of the core and more preferentially at least 99% of the surface of the core.

The expressions "coating composition" and "covering composition" are used interchangeably in the description.

The term "viscosifying agent" or "viscosifying compound" is intended to mean a compound which has the property of decreasing the fluidity of a liquid or a composition and thus of increasing the viscosity thereof.

For the purposes of the invention, the terms "viscosifying agent" and "viscosifying compound" are used interchangeably and independently of one another.

For the purposes of the invention, the viscosifier is a material that has a dynamic viscosity greater than or equal to 50 mPa·s$^{-1}$, preferably from 50 mPa·s$^{-1}$ to 550 mPa·s$^{-1}$, more preferentially from 80 mPa·s$^{-1}$ to 450 mPa·s$^{-1}$, the viscosity being a Brookfield viscosity measured at 65° C. The viscosity of a viscosifying agent according to the invention is measured at 65° C. by means of a Brookfield CAP 2000+ viscometer and at a rotation speed of 750 rpm. The measurement is read after 30 seconds for each temperature.

Preferably, the viscosifying agent is chosen from:
gelling compounds preferably of plant or animal origin, such as: gelatin, chitosan, modified chitosan, agar-agar, alginates, cellulose derivatives, starches, modified starches, or gellan gums;
polyethylene glycols (PEGs) such as PEGs having a molecular weight of between 800 g·mol$^{-1}$ and 8000 g·mol$^{-1}$, for example a PEG having a molecular weight of 800 g·mol$^{-1}$ (PEG-800), a PEG having a molecular weight of 1000 g·mol$^{-1}$ (PEG-1000), a PEG having a molecular weight of 1500 g·mol$^{-1}$ (PEG-1500), a PEG having a molecular weight of 4000 g·mol$^{-1}$ (PEG-4000) or a PEG having a molecular weight of 6000 g·mol$^{-1}$ (PEG-6000);
silicones;
mixtures of such compounds.

Advantageously, the viscosifying agent is chosen from:
gelling compounds preferably of plant or animal origin, such as gelatin, agar agar, alginates, cellulose derivatives or gellans gums;
polyethylene glycols (PEGs) such as PEGs having a molecular weight of between 800 g·mol$^{-1}$ and 8000 g·mol$^{-1}$, for example a PEG having a molecular weight of 800 g·mol$^{-1}$ (PEG-800), a PEG having a molecular weight of 1000 g·mol$^{-1}$ (PEG-1000), a PEG having a molecular weight of 1500 g·mol$^{-1}$ (PEG-1500), a PEG having a molecular weight of 4000 g·mol$^{-1}$ (PEG-4000) or a PEG having a molecular weight of 6000 g·mol$^{-1}$ (PEG-6000);
silicones;
mixtures of such compounds.

According to one embodiment of the invention, the coating layer is obtained by applying a composition comprising at least one viscosifying compound and at least one anticaking compound over all or part of the surface of the core of the solid binder composition.

Preferably, the coating layer is solid at ambient temperature, including at high ambient temperature.

Preferably, the composition comprising at least one viscosifying compound and at least one anticaking compound has a viscosity greater than or equal to 200 mPa·s$^{-1}$, preferably of between 200 mPa·s$^{-1}$ and 700 mPa·s$^{-1}$, the viscosity being a Brookfield viscosity.

Preferentially, the coating layer comprises at least 10% by weight of at least one viscosifying compound relative to the total weight of the coating layer, preferably from 10% to 90% by weight, more preferentially from 10% to 85% by weight.

Advantageously, when the vicosifier is a gelling agent, such as, for example, gelatin, the coating layer comprises from 10% to 90% by weight of viscosifying compound relative to the total weight of the coating layer, preferably from 15% to 85% by weight, even better still from 15% to 60%.

Advantageously, when the vicosifier is a gelling agent, such as, for example, gelatin, the coating layer comprises from 10% to 90% by weight of anticaking compound relative to the total weight of the coating layer, preferably from 15% to 85%, even better still from 40% to 85%.

Advantageously, when the vicosifier is a PEG, such as for example a PEG having a molecular weight between 800 g·mol$^{-1}$ and 8000 g·mol$^{-1}$, the coating layer comprises from 10% to 90% by weight of viscosifying compound relative to the total weight of the coating layer, preferably 40% to 90%, even better still from 60% to 90%.

Advantageously, when the vicosifier is a PEG, such as for example a PEG having a molecular weight of between 800 g·mol$^{-1}$ and 8000 g·mol$^{-1}$, the coating layer comprises from 10% to 90% by weight of anticaking compound relative to the total weight of the coating layer, preferably from 10% to 60%, even better still from 10% to 40%.

Preferentially, the coating layer comprises at least 10% by weight of an anticaking compound relative to the total weight of the coating layer, preferably from 10% to 90% by weight, even more preferentially from 15% to 90% by weight.

Preferably, the coating layer represents at least 5% by weight relative to the total weight of the pellets, preferably from 10 to 60% by weight and more preferentially from 10 to 50%.

Advantageously, the viscosifying compound and the anticaking compound represent at least 90% by weight relative to the total weight of the coating layer, better still at least 95% by weight and advantageously at least 98% by weight.

According to a preferred embodiment, the coating layer is essentially constituted of the viscosifying compound and of the anticaking compound.

Besides the viscosifying compound and the anticaking compound, the coating layer may optionally comprise one or more compounds chosen from: chemical additives, polymers, etc.

According to one preferred embodiment of the invention, the binder pellets have:
a core comprising at least one binder composition as defined above, and
a coating layer comprising gelatin or a PEG and at least one anticaking compound chosen from fines, generally less than 125 μm in diameter; wood residues such as lignin, conifer needle powders and conifer cone powders; crumb rubber; SBS copolymer powder; fumed silicas, in particular hydrophilic or hydrophobic fumed silicas; pyrogenic silicas, in particular hydrophobic or hydrophilic pyrogenic silicas; and mixtures thereof.

More preferably, the binder pellets have:
a core comprising at least one binder composition as defined above, and
a coating layer comprising gelatin or a PEG and at least one anticaking compound chosen from fines, generally less than 125 μm in diameter; lignin; crumb rubber; fumed silicas, in particular hydrophilic or hydrophobic fumed silicas; pyrogenic silicas, in particular hydrophobic or hydrophilic pyrogenic silicas; SBS copolymer powder.

According to a more preferred embodiment, the binder pellets essentially consist of:
a core consisting of a binder composition as defined above, and
a coating layer consisting of a mixture of gelatin or of a PEG, with at least one anticaking compound chosen from fines, generally less than 125 μm in diameter; lignin; crumb rubber; SBS copolymer powder; fumed silicas, in particular hydrophilic or hydrophobic fumed silicas; pyrogenic silicas, in particular hydrophobic or hydrophilic pyrogenic silicas.

Preferentially, the binder pellets essentially consist of:
- a core consisting of a binder composition as defined above comprising a chemical additive (I) as defined above and a chemical additive (II) as defined above, and
- a coating layer consisting of a mixture of gelatin or of a PEG, with at least one anticaking compound chosen from fines, generally less than 125 μm in diameter; lignin; crumb rubber; SBS copolymer powder; fumed silicas; pyrogenic silicas, in particular hydrophobic or hydrophilic pyrogenic silicas.

According to one embodiment of the invention, the binder pellets comprise a core and a coating layer wherein:
- the core comprises at least one binder composition as defined above, and
- the coating layer comprises at least one oil as defined above.

Advantageously in this embodiment, the coating composition comprises at least one organogelator compound and, where appropriate, other additives. The other additives can be chosen, for example, from: agglomeration-inhibiting compounds, adhesion dopants, elastomers for bitumen, etc.

More advantageously, the coating composition comprises at least one organogelator compound chosen from the compounds of formula (I) as defined above, the compounds of formula (II) as defined above and the compounds of formula (III) as defined below.

The organogelator compound of formula (III) is a compound:

(R—NHCO)$_x$—Z—(NHCO—R')$_y$    (III), wherein:
R and R', which may be identical or different, represent a saturated or unsaturated and linear, branched or cyclic hydrocarbon-based chain comprising from 1 to 22 carbon atoms which is optionally substituted and which optionally comprises heteroatoms, such as N, O or S, $C_5$-$C_{24}$ hydrocarbon rings and/or $C_4$-$C_{24}$ hydrocarbon heterocycles comprising one or more heteroatoms, such as N, O or S, Z represents a trifunctionalized group chosen from the following groups:

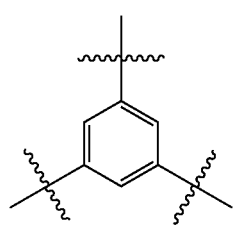

$Z_1$

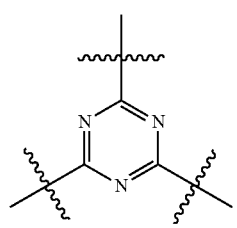

$Z_2$

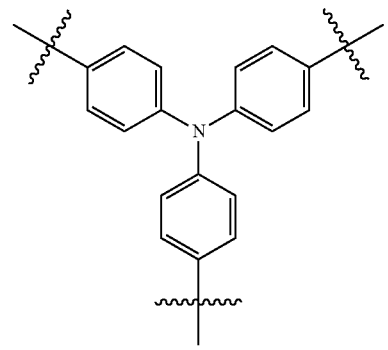

$Z_3$ x and y are different integers with a value ranging from 0 to 3, and such that x+y=3.

Preferably, when x is equal to 0 and Z represents $Z_2$, the compound of formula (III) is N2,N4,N6-tridecylmelamine having the following formula, with R' representing the $C_9H_{19}$ group:

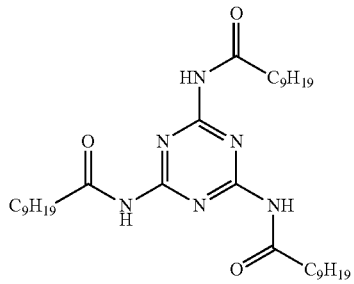

Other preferred compounds corresponding to the formula (III) are such that x is equal to 0, Z represents $Z_2$ and R' represents a saturated linear hydrocarbon-based chain of 1 to 22 carbon atoms, preferably of 2 to 18 carbon atoms, preferably of 5 to 12 carbon atoms.

Other preferred compounds corresponding to the formula (III) are such that: y is equal to 0 and Z represents $Z_1$; the compounds then have the formula:

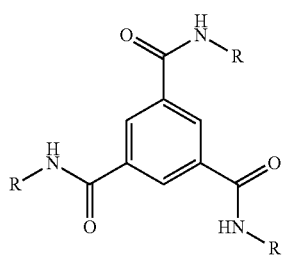

with R chosen from the following groups, taken alone or as mixtures:

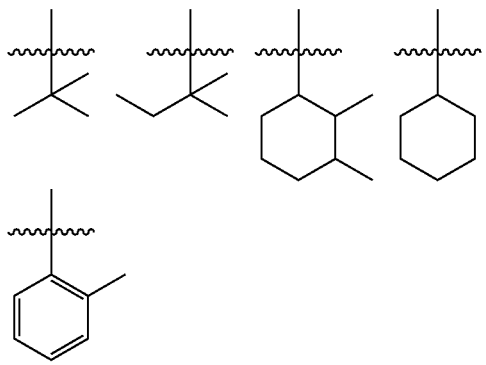

Other preferred compounds corresponding to the formula (III) are such that: y is equal to 0, Z represents $Z_1$ and R represents a saturated linear hydrocarbon-based chain of 1 to 22 carbon atoms, preferably of 8 to 12 carbon atoms.

Preferably, the coating composition comprises at least one organogelator compound of formula (I), (II) or (III), chosen from:
2',3-bis[(3-[3,5-di(tert-butyl)-4-hydroxyphenyl]propionyl)]propionohydrazide,
N,N'-ethylenedi(stearamide) of formula $C_{17}H_{35}$—CONH—$CH_2$—$CH_2$—NHCO—$C_{17}H_{35}$,
sebacic acid,
and
mixtures of these compounds.

Advantageously, the coating composition comprises from 0.1% to 10% by weight, preferably from 0.2% to 5% by weight, more preferably from 0.5% to 3.5% by weight, of an organogelator compound, relative to the total weight of the coating composition.

Advantageously, the coating composition comprises, or is essentially composed of:
80% to 99.9% by weight of at least one oil chosen from: hydrocarbon-based oils of petroleum or synthetic origin, advantageously from hydrocarbon-based oils of petroleum origin,
0.1% to 10% by weight of at least one organogelator compound,
0% to 10% by weight of one or more other additives,
relative to the total weight of the composition.

Preferably, the coating composition comprises, or is essentially composed of:
85% to 99.8% by weight of at least one oil chosen from: hydrocarbon-based oils of petroleum or synthetic origin, advantageously from hydrocarbon-based oils of petroleum origin,
0.2% to 5% by weight of at least one organogelator compound,
0% to 10% by weight of one or more other additives,
relative to the total weight of the composition.

More preferably, the coating composition comprises, or is essentially composed of:
86.5% to 99.5% by weight of at least one oil chosen from: hydrocarbon-based oils of petroleum or synthetic origin, advantageously from hydrocarbon-based oils of petroleum origin,
0.5% to 3.5% by weight of at least one organogelator compound,
0% to 10% by weight of one or more other additives,
relative to the total weight of the composition.

According to one embodiment of the invention, the binder pellets may also comprise one or more other coating layers, based on anticaking agent covering all or part of the coating layer of the binder that is solid under cold conditions according to the invention.

Binder Block

According to one embodiment of the invention, the binder composition that is solid under cold conditions and in divided form is in block form. For the purposes of the invention, the binder composition in block form is also known as a "binder block".

The term "binder block" is intended to mean a block of binder composition according to the invention having a weight of between 0.5 kg and 1000 kg, preferably between 1 kg and 200 kg, more preferentially between 1 kg and 50 kg, even more preferentially between 5 kg and 25 kg, even more preferentially between 10 kg and 30 kg, said block being advantageously parallelepipedal, preferably being like a paving stone.

The binder block preferably has a volume of between 1000 $cm^3$ and 50 000 $cm^3$, preferably between 5000 $cm^3$ and 25 000 $cm^3$, more preferentially between 10 000 $cm^3$ and 30 000 $cm^3$, even more preferentially between 14 000 $cm^3$ and 25 000 $cm^3$ When the binder block is handled manually by one person, the weight of the binder composition block may range from 0.5 g to 20 kg, and from 20 to 50 kg when handled by two people. When the handling is performed by mechanical equipment, the weight of the binder block may range from 50 to 1000 kg.

The binder block is manufactured from the supplemented binder composition as described above according to any industrially known process, for example by extrusion, by molding, or according to the manufacturing process described in US2011/0290695.

Advantageously, the binder block is wrapped in a hot-melt film according to any known process, preferably with a film made of polypropylene or polyethylene or a mixture of polyethylene and polypropylene. The binder composition packaged as a binder block wrapped in a hot-melt film has the advantage of being ready to use, i.e. it may be heated directly in the melting machine without being unwrapped beforehand, for example for the manufacture of emulsion, or may optionally be introduced directly into the coating unit for the manufacture of bituminous mixes. The hot-melt material that melts with the supplemented binder composition does not affect the properties of said binder composition.

The binder block according to the invention may also be covered with anticaking compound as defined above and/with a coloring agent as defined above and/or with a coating composition as defined above.

In this variant, the preferences, the advantages and the various embodiments described for the anticaking compounds, the coloring agents and the coating compositions also apply.

The binder block may also be packaged in a cardboard container according to any known process.

In particular, the binder block is packaged in a cardboard container by hot-casting the binder composition according to the invention in a cardboard container, the wall of the inner face of which is siliconized, and then cooled, the dimensions of the cardboard container being suited to the weight and/or volume of the desired binder block.

When the binder block is wrapped in a hot-melt film or is packaged in a cardboard container, the Applicant has demonstrated that the deterioration of said hot-melt film or of said cardboard container during the transportation and/or storage and/or handling under cold conditions of said binder block did not lead to the binder composition undergoing creep. Consequently, the binder blocks retain their initial form and do not stick together during the transportation and/or storage and/or handling thereof under cold conditions, even if the hot-melt film or the cardboard container is damaged. The absence of creep of the binder composition in the form of block during its transportation and/or storage and/or handling under cold conditions is due to the presence of the mixture of chemical additives (I) and (II) within the binder composition.

Aggregates

The mastic asphalt composition is composed of a binder and of mineral fillers chosen from aggregates. The mineral fillers used according to the invention represent for example 70% to 94.5%, 75% to 94%, 75% to 94.5%, 71 to 93.5%, 85% to 94%, 86% to 93% by weight of the total weight of the mastic asphalt composition. The mineral fillers according to the invention are chosen from fines or fillers, sands and stone chippings. The fines, the fillers, the sands and the stone chippings are aggregates preferably corresponding to the specifications of the standard NF EN 13043. An aggregate may be natural, artificial or recycled. Natural aggregate is an aggregate of mineral origin which has undergone no transformation other than mechanical. Artificial aggregate is an aggregate of mineral origin resulting from an industrial process comprising thermal transformations or the like. Aggregates are generally denoted in terms of lower dimension (d) and upper dimension (D) of 25 sieves, expressed in the form "d/D" corresponding to the granular category. This designation accepts that grains can be retained on the upper sieve (oversize on D) and that others can pass through the lower sieve (passing through d). Aggregates are grains with dimensions of between 0 and 125 mm. Fines like fillers are a granular fraction of an aggregate which passes through the 0.063 mm sieve. The filler is an aggregate, most of the grains of which pass through the 0.063 mm sieve, which can be added to construction materials in order to give them certain properties. Sands are 0/2 aggregates according to the standard NF EN 13043 for bituminous mixtures. Stone chippings are aggregates for which d>2 mm and D<45 mm according to the standard NF EN 13043 for bituminous mixtures and coatings.

According to the invention, the fines are of any mineral nature. They are preferably chosen from limestone-type fillers. The particle size of the fines according to the invention is preferably less than 63 μm. The fines represent 20% to 40%, preferably 20% to 35%, by weight of the total weight of the mastic asphalt composition according to the invention, in particular when they are limestone-type fillers.

According to the invention, the sands are preferably chosen from semi-crushed or rolled sands. The particle size of the sands according to the invention is preferably between 63 μm and 2 mm. The sands advantageously represent from 15% to 45%, preferably 20% to 40%, by weight of the total weight of the mastic asphalt composition according to the invention.

According to the invention, the stone chippings are chosen from stone chippings of any geological nature of density greater than 1.5. Preferably, the particle size of the stone chippings according to the invention is between 2 mm and 14 mm. The stone chippings are preferably chosen from the particle sizes 2/6, 4/6, 6/10, and 10/14. The stone chippings advantageously represent from 20% to 55%, preferably 25% to 45% by weight of the total weight of the asphalt composition according to the invention, in particular when they have a particle size 2/6 and/or 4/6 and/or 6/10 and/or 10/14.

Mastic Asphalt Composition

The binder according to the invention advantageously represents from 5% to 20%, preferably 5% to 10%, and even better still 6% to 9%, by weight of the total weight of the mastic asphalt composition.

The aggregates or mineral fillers chosen from fines or fillers, sands and stone chippings advantageously represent from 80% to 95%, preferably 90% to 95%, and even better still 91% to 94%, by weight of the total weight of the mastic asphalt composition.

The mastic asphalt composition according to the invention preferably comprises, or better still essentially consists of:
  from 5% to 20% of the binder composition as defined above,
  from 15% to 40% of fines,
  from 15% to 45% of sand,
  from 10% to 45% of stone chippings,
  the percentages being expressed by weight relative to the total weight of the mastic asphalt composition.

The mastic asphalt composition according to the invention preferably comprises, or better still essentially consists of:
  from 5% to 10% of the binder composition as defined above,
  from 15% to 35% of fines,
  from 20% to 45% of sand,
  from 15% to 40% of stone chippings,
  the percentages being expressed by weight relative to the total weight of the mastic asphalt composition.

The mastic asphalt composition according to the invention preferably comprises, or better still essentially consists of:
  from 6% to 9% of the binder composition as defined above,
  from 20% to 30% of fines,
  from 30% to 45% of sand,
  from 15% to 30% of stone chippings,
  the percentages being expressed by weight relative to the total weight of the mastic asphalt composition.

Process for Manufacturing the Mastic Asphalt Composition

Advantageously, the process for manufacturing mastic asphalts according to the invention comprises at least the steps of:
  heating the aggregates to a temperature ranging from 100° C. to 200° C., preferably from 120° C. to 180° C., even more advantageously from 120° C. to 160° C.,
  mixing the aggregates with the binder composition, in a vessel such as a mixer or a mixing drum,
  kneading the mixture in a mixer equipped with blades,
  obtaining a mastic asphalt composition.

The various components of the mastic asphalt composition according to the invention, in particular the binder, and the aggregates, are mixed according to the proportions defined in the mastic asphalt composition of the invention. They are then mixed and kneaded continuously in order to form a homogeneous mixture and to maintain the homogeneity of the mixture until it is applied. This mixing and this kneading are carried out at a temperature ranging from 120° C. to 200° C. The duration of the mixing is a few seconds to a few minutes, the duration of the mixing is 0.5 to 4 hours, advantageously 1.5 to 2.5 hours. Once poured and cooled, the mixture hardens and constitutes an asphalt surfacing that can be used as traffic lanes. The thickness of the surfacing according to the invention varies for example from 15 to 40 mm, and preferably from 20 to 25 mm. The asphalt according to the invention is poured conventionally, that is to say independently or adhered to any support in accordance with the rules of the art, with or without interposition of a glass mesh.

Advantageously, the process of the invention is carried out with a binder composition that is in solid form under cold conditions and divided, for instance in the form of binder pellets or binder blocks.

According to this variant, the process of the invention exhibits the advantage of being able to be carried out without a preliminary step of heating the solid-binder pellets or solid-binder blocks.

The process for manufacturing mastic asphalts according to the invention does not require a step of heating the solid-binder pellets or solid-binder blocks before mixing with the aggregates because in contact with the hot aggregates, the binder that is solid at ambient temperature melts.

The binder that is solid at ambient temperature as described above has the advantage of being able to be added directly to the hot aggregates, without having to be melted prior to mixing with the hot aggregates.

Preferably, the step of mixing of the aggregates and of the road binder is performed with stirring, and stirring is then maintained for not more than 5 minutes, preferably not more than 1 minute to allow the production of a homogeneous mixture.

Surfacing

The invention also relates to a surfacing of a surface, in particular traffic lanes, having improved mechanical properties, in particular an improved indentation resistance, this surfacing being obtained from a mastic asphalt composition according to the invention.

Among the surfaces concerned, mention may be made of: carriageways, ground surfaces of carparks; pedestrian walkways, such as sidewalks or terraces; urban developments, such as skateboard runs; ground surfaces of sport equipment or of industrial sites. The mastic asphalts of the invention may also be used in the waterproofing of buildings or of civil engineering works; for special technical applications such as mastics for rockfills, coldroom floors, interior or exterior anti-acid asphalts.

FIG. 1: graphic representation of irreversible creep compliance divided by the stress (along the ordinate in kPa$^{-1}$) of bituminous binder compositions C9, C10, C11 and C12 after a creep-recovery cycle as a function of the stress (along the abscissa in Pa)

Legend:

●=C9; ■=C10; ▲=C11; X=C12

Figure 2:
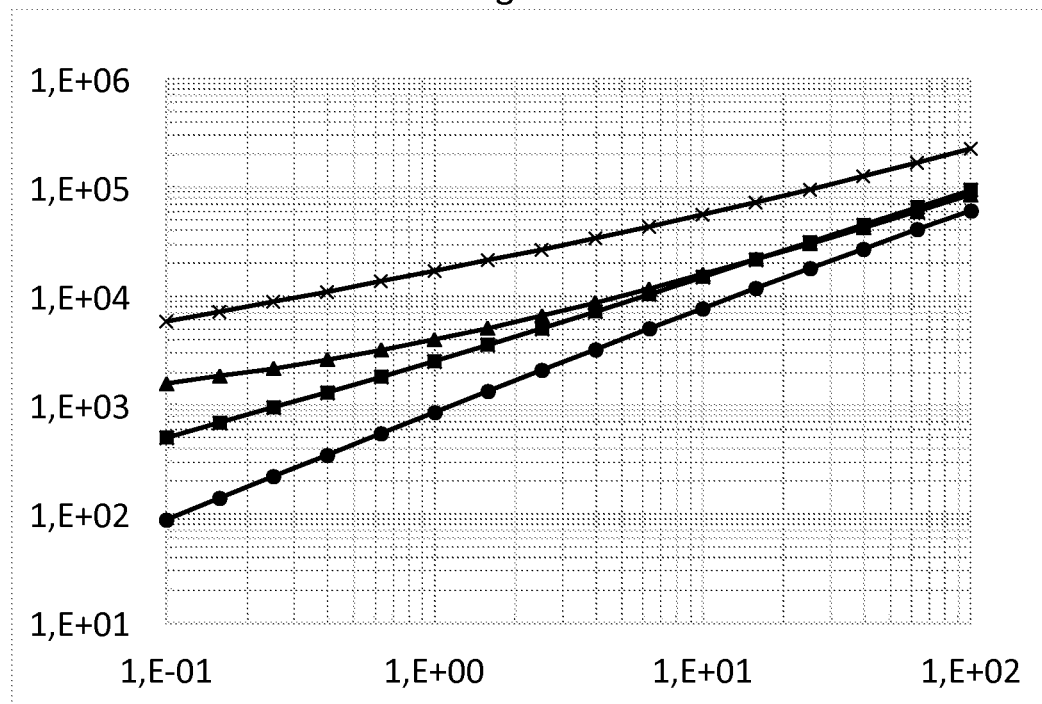
FIG. 2 is a graphic representation of the complex modulus G* of compositions C9, C10, C11 and C12.

FIG. 2: graphic representation of the complex modulus G* (along the ordinate in Pa) of compositions C9, C10, C11 and C12, measured at 60° C. and at a frequency of between 0.1 and 100 Hz (along the abscissa, the angular frequency expressed in rad/s)

Legend:

●=C9; ■=C10; ▲=C11; X=C12

Figure 3:
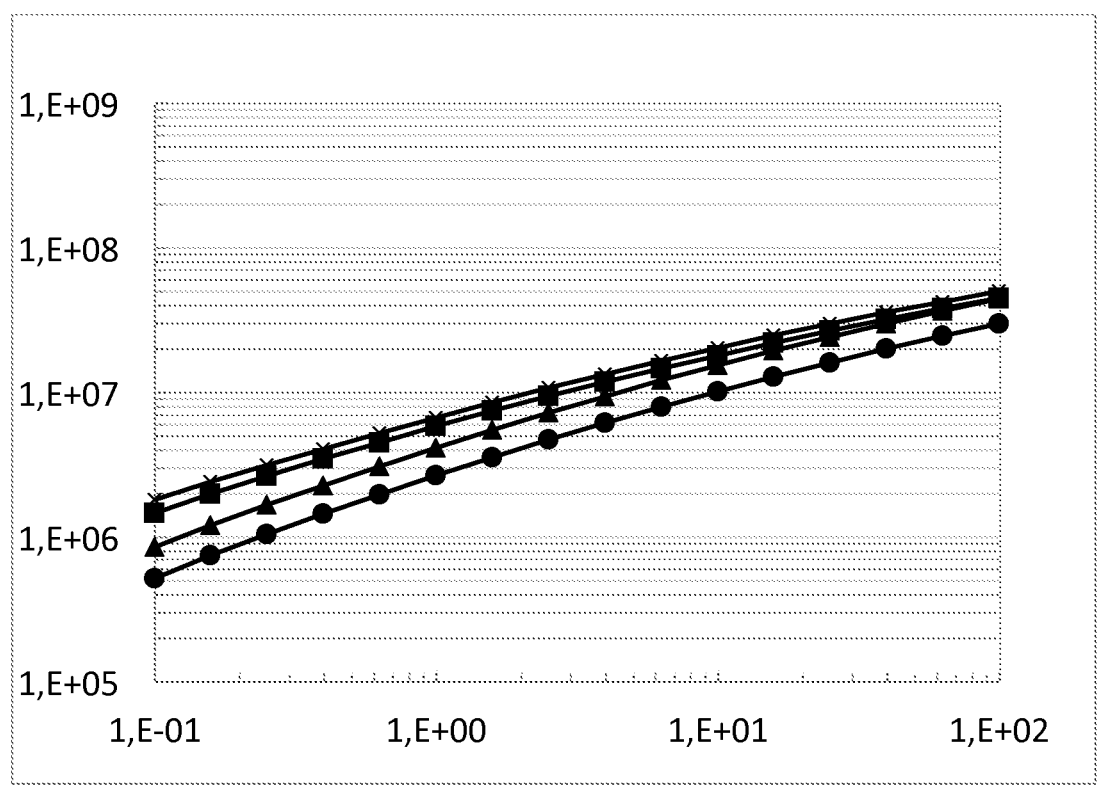
FIG. 3 is a graphic representation of the complex modulus G* of compositions C9, C10, C11 and C12.

FIG. 3: graphic representation of the complex modulus G* (along the ordinate in Pa) of compositions C9, C10, C11 and C12, measured at 15° C. and at a frequency of between 0.1 and 100 Hz (along the abscissa, the angular frequency expressed in rad/s)

Legend:

●=C9; ■=C10; ▲=C11; X=C12

Experimental Section

Materials and methods

The properties of the bitumens are measured by means of the methods described below:

Needle penetrability at 25° C. (P25): units=1/10 mm, standard EN 1426

Ring and ball softening point (RBSP): units=° C., standard EN 1427

Dynamic viscosity (V Dyn): NF EN 13702, measured at temperatures of 100° C., 110° C., 120° C., 130° C., 140° C., 160° C., 180° C., 200° C.

Resistance under load according to the standard NFT66 002: texture analyzer model TAXT2 by the company Ametek at 35° C. V=1 mm/min on 10 mm of depression The maximum force and the force are measured at 10 mm in Newtons (N).

The resistance at the maximum force and at 10 mm in Newtons per millimeter (N/mm) is evaluated.

Complex modulus G* of the bituminous mastic composition measured at 15° C. and 60° C. and at a frequency of between 0.1 and 100 Hz: unit=MPa or Pa, EN 14770 standard. The test was performed using an oscillating shear rheometer (Model: Anton Paar). The results are reported as a function of the angular frequency expressed in rad/s.

Multiple Stress Creep Recovery Test (MSCRT) measurement, measured according to the standard NF EN 16659. The test was carried out using a DSR dynamic shear rheometer in creep mode at a temperature of 60° C. The irreversible creep compliance was measured, that is to say the residual deformation of a test specimen after a creep-recovery cycle divided by the applied stress.

Starting Materials:

Bitumen base (B): Several bitumen bases, the characteristics of which are presented below, were used:

a bitumen base of 35/50 grade, denoted $B_1$, having a penetrability $P_{25}$ of 41 1/10 mm and an RBSP of 52° C. and commercially available from the Total group under the brand name Azalt®;

a bitumen base of 50/70 grade, denoted $B_2$, having a penetrability $P_{25}$ of 58 1/10 mm and an RBSP of 49.6° C. and commercially available from the Total group under the brand name Azalt®;

a bitumen base of 35/50 grade, denoted $B_3$, having a penetrability $P_{25}$ of 37 1/10 mm and an RBSP of 52° C. and commercially available from the Total group under the brand name Azalt®;

Additives:

Additive A1 of formula (I): sebacic acid

Additive A2 of formula (II): N,N'-ethylenedi(stearamide) sold by the company Croda under the name Crodawax 140®

Compositions:

The bitumen base ($B_1$, $B_2$ or $B_3$) is introduced into a reactor maintained at 160° C. with stirring at 300 rpm for two hours. The additive(s) are then introduced into the reactor. The contents of the reactor are maintained at 160° C. with stirring at 300 rpm for 1 hour.

Compositions C2 to C8 are prepared by bringing the bitumen base into contact with the additives, according to tables 1 and 2 below. The amounts are expressed as percentage by weight of additive compound relative to the total weight of the composition. Compositions C1 to C3 and C9 to C11 are comparative, compositions C4 to C8 and C12 are according to the invention.

TABLE 1 content of the compositions C1 to C8

|  | C1 | C2 | C3 | C4 | C5 | C6 | C7 | C8 |
|---|---|---|---|---|---|---|---|---|
|  |  |  |  | Bitumen base |  |  |  |  |
|  | B1 | B1 | B1 | B1 | B1 | B1 | B1 | B2 |
| A1 | — | 1.5% | — | 1.5% | 1% | 1.5% | 0.5% | 1.5% |
| A2 | — | — | 3.5% | 3.5% | 3% | 2.5% | 4% | 2.5% |

TABLE 2 content of the compositions C9 to C12

|  | C9 | C10 | C11 | C12 |
|---|---|---|---|---|
| Bitumen base | B3 | B3 | B3 | B3 |
| A1 | — | 1.5% | — | 1.5% |
| A2 | — | — | 2.5% | 2.5% |

Results:

The results of the measurements of the properties of the bitumen compositions are set out in table 3 below.

TABLE 3

Properties of compositions C1 to C8

|  | C1 | C2 | C3 | C4 | C5 | C6 | C7 | C8 |
|---|---|---|---|---|---|---|---|---|
| P25 (1/10 mm) | 39 | 20 | 28 | 20 | 19 | 21 | 23 | 20 |
| RBSP (° C.) | 53 | 104 | 106 | 108 | 106 | 105 | 105 | 105.5 |
| V Dyn 120° C. | 1.85 | 1.67 | 1.34 | 1.23 | — | 1.39 | 1.29 | — |
| V Dyn 130° C. | 1.02 | 0.916 | 0.769 | 0.7 | — | 0.79 | 0.736 | — |
| V Dyn 140° C. | 0.602 | 0.532 | 0.46 | 0.421 | — | 0.475 | 0.445 | — |
| V Dyn 160° C. | 0.251 | 0.212 | 0.198 | 0.183 | — | 0.2 | 0.189 | — |
| V Dyn 180° C. | 0.119 | 0.101 | 0.102 | 0.091 | — | 0.095 | 0.093 | — |
| V Dyn 200° C. | 0.063 | 0.061 | 0.058 | 0.052 | — | 0.058 | 0.050 | — |
| Force Max à 35° C. | 3.2 | 34.3 | 12.4 | 102 | 92 | 101 | 57.5 | — |
| Force at 10 mm at 35° C. | 3.2 | 32 | 12.4 | 100 | 90 | 101 | 57.5 | — |
| Resistance at Max force at 35° C. | 9 | 233 | 66 | 568 | 475 | 566 | 388 | — |
| Resistance at 10 mm at 35° C. | 9 | 260 | 66 | 790 | 727 | 855 | 424 | — |
| Max Force at 50° C. | — | — | — | — | — | 41 | — | 38 |
| Resistance at Max force at 50° C. | — | — | — | — | — | 98 | — | 53 |
| Resistance at 10 mm at 50° C. | — | — | — | — | — | 337 | — | 302 |

It is found that compositions C4, C5, C6, C7 and C8 have, at ambient temperature, mechanical properties very significantly greater than those of comparative compositions C1 to C3, without their viscosity under hot conditions being degraded (increased).

TABLE 4

Properties of compositions C9 to C12

|  | C9 | C10 | C11 | C12 |
|---|---|---|---|---|
| P25 (1/10 mm) | 37 | 26 | 33 | 20 |
| RBSP (° C.) | 52 | 103 | 93 | 102 |
| V Dyn 140° C. | 0.747 | 0.468 | 0.428 | 0.349 |

TABLE 4-continued

Properties of compositions C9 to C12

|  | C9 | C10 | C11 | C12 |
|---|---|---|---|---|
| V Dyn 160° C. | 0.253 | 0.192 | 0.179 | 0.159 |
| V Dyn 180° C. | 0.113 | 0.091 | 0.086 | 0.079 |

It is found that composition C12 according to the invention has a lower viscosity under hot conditions than those of comparative compositions C9 to C11.

Complex Modulus G*

It was demonstrated that composition C12 according to the invention has a complex modulus G* greater than the complex modulus of comparative compositions C9 to C11, whatever the frequency at which the complex modulus G* is measured over the operating temperature range of between 15 and 60° C.

The complex modulus G* in particular reflects the mechanical strength of the compositions; it is therefore demonstrated that composition C12 according to the invention has a better mechanical strength compared to the comparative compositions.

Multiple Stress Creep Recovery Test (MSCRT) Measurement

It was demonstrated that composition C12 according to the invention exhibits an irreversible creep compliance (Jnr) lower than the irreversible creep compliance of comparative compositions C9 to C11, whatever the cumulative shear stress at which the irreversible creep compliance is measured, at an operating temperature of 60° C.

The irreversible creep compliance reflects in particular the resistance of the composition to permanent deformation; it is therefore demonstrated that composition C12 according to the invention has a better resistance to permanent deformation compared to comparative compositions C9 to C11.

As a result, the compositions according to the invention have mechanical properties that are superior to those of the comparative compositions without their viscosity under hot conditions being degraded (increased).

Consequently, the binders according to the invention are entirely suitable for uses thereof as binders for the manufacture of mastic asphalts by virtue of a viscosity that is at least preserved at temperatures of between 160° C. and 200° C. and also greater mechanical properties compared with the comparative binder compositions.

The invention claimed is:
1. A mastic asphalt composition comprising:
   (i) 5% to 20% by weight of a composition comprising at least:
   a binder base chosen from:
      a bitumen base,
      a pitch base,
      a clear binder, or
      a mixture of one or more of these binder bases,
   an acid compound of general formula (I):

$$R\text{---}(COOH)_z \tag{I}$$

wherein R represents a linear or branched, saturated or unsaturated chain comprising from 4 to 68 carbon atoms and z is an integer ranging from 2 to 4,
   an amide compound of general formula (II):

$$R'\text{---}(NH)_n CONH\text{---}(X)_m\text{---}(NHCO)_p(NH)_n\text{---}R'' \tag{II}$$

wherein:
   the R' and R'' groups, which may be identical or different, represent a saturated or unsaturated and linear, branched or cyclic hydrocarbon-based chain comprising from 1 to 22 carbon atoms which optionally comprises heteroatoms, $C_5$-$C_{24}$ hydrocarbon-based rings and/or $C_4$-$C_{24}$ hydrocarbon-based heterocycles comprising one or more heteroatoms, and R'' may be H;
   the X group represents a saturated or unsaturated and linear, cyclic or branched hydrocarbon-based chain comprising from 1 to 22 carbon atoms which is optionally substituted and which optionally comprises heteroatoms, $C_5$-$C_{24}$ hydrocarbon-based rings and/or $C_4$-$C_{24}$ hydrocarbon-based heterocycles comprising one or more heteroatoms;
   n and m and p are integers having a value of 0 or 1, independently of one another, and
   the compounds (I) and (II) are present in a weight ratio ranging from 10:1 to 1:16, and
   (ii) 15% to 40% of fines,
   (iii) from 15% to 45% of sand,
   (iv) from 10% to 45% of stone chippings,
   wherein fines, sand and stone chippings are named aggregates, the percentages being expressed by weight relative to the total weight of the composition.
2. The mastic asphalt composition as claimed in claim 1, wherein the compounds (I) and (II) are present in a weight ratio ranging from 5:1 to 1:9.
3. The mastic asphalt composition as claimed in claim 1, wherein the additive (I) is a diacid of general formula HOOC—$C_wH_{2w}$—COOH, wherein w is an integer varying from 4 to 22.
4. The mastic asphalt composition as claimed in claim 3, wherein the additive (I) is sebacic acid.
5. The mastic asphalt composition as claimed in claim 1, which comprises from 0.1% to 5% by weight of the additive (I) relative to the total weight of the binder composition.
6. The mastic asphalt composition as claimed in claim 1, which comprises from 0.1% to 5% by weight of the additive (II) relative to the total weight of the binder composition.
7. The mastic asphalt composition as claimed in claim 1, wherein the additive (II) is chosen from those of formula (IIA):

$$R'\text{---}CONH\text{---}(X)_m\text{---}NHCO\text{---}R'' \tag{IIA}$$

wherein:
the R' and R'' groups, which may be identical or different, represent a saturated or unsaturated and linear, branched or cyclic hydrocarbon-based chain comprising from 1 to 22 carbon atoms which optionally comprises heteroatoms, $C_5$-$C_{24}$ hydrocarbon-based rings and/or $C_4$-$C_{24}$ hydrocarbon-based heterocycles comprising one or more heteroatoms;
the X group represents a saturated or unsaturated and linear, cyclic or branched hydrocarbon-based chain comprising from 1 to 22 carbon atoms which is optionally substituted and which optionally comprises heteroatoms, $C_5$-$C_{24}$ hydrocarbon-based rings and/or $C_4$-$C_{24}$ hydrocarbon-based heterocycles comprising one or more heteroatoms;
m is an integer having a value of 0 or 1.
8. The mastic asphalt composition as claimed in claim 1, wherein the additive (II) is chosen from those of formula (IIB):

$$R'\text{---}CONH\text{---}R'' \tag{IIB}$$

wherein:
the R' and R'' groups, which may be identical or different, represent a saturated or unsaturated and linear, branched or cyclic hydrocarbon-based chain comprising from 1 to 22 carbon atoms which optionally comprises heteroatoms, $C_5$-$C_{24}$ hydrocarbon-based rings and/or $C_4$-$C_{24}$ hydrocarbon-based heterocycles comprising one or more heteroatoms.
9. The mastic asphalt composition as claimed in claim 1, wherein the compound of general formula (II) is chosen from:
hydrazides;
diamides;
monoamides.
10. The mastic asphalt composition as claimed in claim 9, wherein the compound of general formula (II) is chosen from hydrazides selected from the group consisting of: $C_5H_{11}$—CONH—NHCO—$O_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$, or $C_{21}H_{43}$—CONH—NHCO—$C_{21}H_{43}$.
11. The mastic asphalt composition as claimed in claim 9, wherein the compound of general formula (II) is chosen from diamides selected from the group consisting of: N,N'-ethylenedi(laurylamide) of formula $C_{11}H_{23}$—CONH—$CH_2$—$CH_2$—NHCO—$C_{11}H_{23}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$, N,N'-ethylenedi(stearamide) of formula $C_{17}H_{35}$—CONH—$CH_2$—$CH_2$—NHCO—$C_{17}H_{35}$.
12. The mastic asphalt composition as claimed in claim 11, wherein the compound of general formula (II) is N,N'-ethylenedi(stearamide) of formula $C_{17}H_{35}$—CONH—$CH_2$—$CH_2$—NHCO—$C_{17}H_{35}$.
13. The mastic asphalt composition as claimed in claim 9, wherein the compound of general formula (II) is chosen from monoamides selected from the group consisting of: laurylamide of formula $C_{11}H_{23}$—$CONH_2$, myristylamide of formula $C_{13}H_{27}$—$CONH_2$, palmitamide of formula $C_{15}H_{31}$—$CONH_2$, stearamide of formula $C_{17}H_{35}$—$CONH_2$.
14. The mastic asphalt composition as claimed in claim 1, which comprises:
   from 6% to 9% of the composition (i),
   from 20% to 30% of fines,
   from 30% to 45% of sand, from 15% to 30% of stone chippings, the percentages being expressed by weight relative to the total weight of the mastic asphalt composition.

15. A process for manufacturing a mastic asphalt composition as claimed in claim 1, which comprises the use of a binder composition comprising at least:

a binder base chosen from:
  a bitumen base,
  a pitch base,
  a clear binder, or
  a mixture of one or more of these binder bases,
an acid compound of general formula (I):

wherein R represents a linear or branched, saturated or unsaturated chain comprising from 4 to 68 carbon atoms and z is an integer ranging from 2 to 4, an amide compound of general formula (II):

wherein:
  the R' and R" groups, which may be identical or different, represent a saturated or unsaturated and linear, branched or cyclic hydrocarbon-based chain comprising from 1 to 22 carbon atoms which optionally comprises heteroatoms, $C_5$-$C_{24}$ hydrocarbon-based rings and/or $C_4$-$C_{24}$ hydrocarbon-based heterocycles comprising one or more heteroatoms, and R" may be H;
  the X group represents a saturated or unsaturated and linear, cyclic or branched hydrocarbon-based chain comprising from 1 to 22 carbon atoms which is optionally substituted and which optionally comprises heteroatoms, $C_5$-$C_{24}$ hydrocarbon-based rings and/or $C_4$-$C_{24}$ hydrocarbon-based heterocycles comprising one or more heteroatoms;
  n and m and p are integers having a value of 0 or 1, independently of one another, and
  the compounds (I) and (II) are present in a weight ratio ranging from 10:1 to 1:16.

16. A process for manufacturing a mastic asphalt composition as claimed in claim 15, which comprises at least the steps of:
  heating the aggregates to a temperature ranging from 100° C. to 180° C.,
  mixing the aggregates with the binder composition,
  kneading the mixture,
  obtaining a mastic asphalt composition.

17. The process as claimed in claim 16, which comprises heating the aggregates to a temperature ranging from 120° C. to 160° C.

18. The process as claimed in claim 15, wherein the binder composition is used in a form that is solid under cold conditions and divided.

19. The process as claimed in claim 16, which does not comprise a step of heating the binder composition before it is mixed with the aggregates.

20. A surfacing of a surface, this surfacing being obtained by means of a process comprising the preparation of a mastic asphalt composition as claimed in claim 1, the application thereof and the spreading thereof on said surface.

* * * * *